(12) United States Patent
De Carvalho et al.

(10) Patent No.: US 10,193,613 B2
(45) Date of Patent: Jan. 29, 2019

(54) PING PONG BEAMFORMING

(71) Applicant: Intel IP Corporation, Santa Clara, CA (US)

(72) Inventors: Elisabeth De Carvalho, Nørresundby (DK); Jørgen Bach Andersen, Gistrup (DK)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 15/513,523

(22) PCT Filed: Oct. 30, 2015

(86) PCT No.: PCT/US2015/058459
§ 371 (c)(1),
(2) Date: Mar. 22, 2017

(87) PCT Pub. No.: WO2016/070122
PCT Pub. Date: May 6, 2016

(65) Prior Publication Data
US 2017/0317735 A1    Nov. 2, 2017

(30) Foreign Application Priority Data

Oct. 30, 2014  (DK) .................. 2014 70666

(51) Int. Cl.
*H04B 7/06*  (2006.01)
*H04B 7/08*  (2006.01)

(52) U.S. Cl.
CPC .......... *H04B 7/0851* (2013.01); *H04B 7/06* (2013.01); *H04B 7/0617* (2013.01); *H04B 7/0695* (2013.01); *H04B 7/08* (2013.01); *H04B 7/088* (2013.01)

(58) Field of Classification Search
CPC ...... H04B 7/0851; H04B 7/0617; H04B 7/06; H04B 7/08; H04B 7/0695; H04B 7/088
See application file for complete search history.

(56) References Cited

U.S. PATENT DOCUMENTS

| | | | |
|---|---|---|---|
| 8,644,184 B1 | 2/2014 | Zhang et al. | |
| 2002/0147032 A1* | 10/2002 | Yoon | H01Q 1/246 455/562.1 |
| 2004/0087275 A1* | 5/2004 | Sugar | H01Q 3/28 455/61 |
| 2004/0209579 A1* | 10/2004 | Vaidyanathan | H04B 7/0615 455/101 |

(Continued)

FOREIGN PATENT DOCUMENTS

JP  2011-515920 A  5/2011

OTHER PUBLICATIONS

International Search Report and Written Opinion dated Jan. 5, 2016 from International Application No. PCT/US2015/058459, 11 pages.

(Continued)

*Primary Examiner* — Syed Haider
(74) *Attorney, Agent, or Firm* — Schwabe, Williamson & Wyatt, P.C.

(57) ABSTRACT

Embodiments of the present disclosure provide an iterative procedure relying on ping-pong transmissions between two antenna arrays to determine desired beamforming weights at each device. Other embodiments may be described and claimed.

22 Claims, 10 Drawing Sheets

(56) References Cited

U.S. PATENT DOCUMENTS

| | | | | |
|---|---|---|---|---|
| 2010/0103893 A1* | 4/2010 | Xia | ........................ | H04B 7/043 |
| | | | | 370/329 |
| 2013/0064315 A1* | 3/2013 | Heath, Jr. | ............... | C23C 14/04 |
| | | | | 375/260 |
| 2015/0289147 A1* | 10/2015 | Lou | ...................... | H04B 7/0408 |
| | | | | 370/329 |

OTHER PUBLICATIONS

Japanese Patent Office—Office Action dated Apr. 3, 2018 from Japanese Patent Application No. 2017-511743, 9 pages.

\* cited by examiner

PING PONG BEAMFORMING

RELATED APPLICATION

This application is a national phase entry under 35 U.S.C. § 371 of International Application No. PCT/US2015/058459, filed Oct. 30, 2015, entitled "PING PONG BEAMFORMING", which designated, among the various States, the United States of America, which claims priority to Denmark Patent Application No. PA201470666, filed Oct. 30, 2014, entitled "PING PONG BEAMFORMING," the disclosures of which are hereby incorporated by reference in their entireties.

TECHNICAL FIELD

Embodiments relate to wireless communication and, in particular, to ping-pong beam forming between at least one first device and at least one second device, both devices having a plurality of antenna elements.

BACKGROUND

Acquiring Channel State Information (CSI) in wireless communications is costly. It generally requires training that takes resources away from data transmission. Training has become an even bigger concern since the emergence of communications involving arrays with a very large number of antenna elements, for which CSI acquisition is a major research focus. In a massive MIMO (multiple inputs-multiple outputs) system, a base station equipped with a massive array communicates with a small number of users. Downlink channel training uses a training length that is proportional to the number of antennas in the massive arrays and becomes impractical.

Existing approaches use a simple iterative algorithm to extract a maximal beamforming gain achievable by two communicating arrays in a reciprocal channel, without knowledge of the channel. Starting with an arbitrary weight factor at one of the arrays transmitting to the other array, a new weight factor is created by a conjugation and normalization. The process is then repeated until convergence. The beamforming weights converge to the maximal (left and right) eigenvectors of the channel matrix. It is just like a ping pong game between two devices, where, at each iteration, a device simply returns the conjugate of the signals that it just received. The beauty of this approach resides in the extreme simplicity it takes to estimate the maximal eigenvectors of the channel matrix.

In existing approaches, a bilateral training procedure is used to directly estimate the beamforming vectors by optimizing the maximum signal-to-interference-plus-noise ratio (SINR) algorithm for the MIMO interference channel. Although it is an efficient procedure for a small number of antennas, it becomes computationally heavy when massive arrays are involved.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF THE INVENTION

Figure 1:
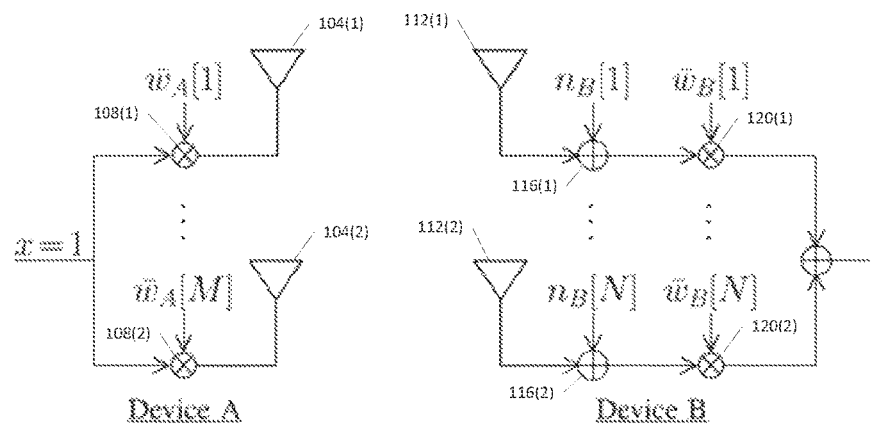
FIG. 1 illustrates a system model for a single user case in which device A with M antennas communicates with device B with N antennas in accordance with some embodiments.

Embodiments of the present disclosure provide an efficient training procedure to estimate the maximal eigenvectors of a MIMO channel in time-division duplex mode. Assuming channel reciprocity, we describe an iterative procedure relying on ping-pong transmissions between two antenna arrays, where, at each iteration, a device simply returns the conjugate of the signal that it was just served. Ping-Pong Beamforming (PPB) converges to the optimal beamforming weights at each communication end, for example, the maximal (left and right) eigenvectors of the channel matrix. PPB requires a few tens of iterations and is robust to additive noise at the receiver end. PPB significantly alleviates the training requirements when both arrays are equipped with a very large number of antennas and therefore has a distinct interest in millimeter-wave communications where such massive arrays are expected. PPB is extended to a multi-user MIMO communication setting where a single stream is sent per user. Training procedures are devised where the eigenvectors of each user's channel is tracked. We show that optimal transceivers can be built from the maximal eigenvectors of the channel, when both ends of the communication link involve massive antenna arrays.

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise.

The phrases "A or B," "A/B," and "A and/or B" mean (A), (B), or (A and B).

As used herein, the term "circuitry" refers to, is part of, or includes hardware components such as an application specific integrated circuit (ASIC), an electronic circuit, a logic circuit, a processor (shared, dedicated, or group) and/or memory (shared, dedicated, or group) that are configured to provide the described operations. In some embodiments, the circuitry may execute one or more software or firmware programs to provide at least some of the described operations. In some embodiments, the circuitry may be implemented in, or operations associated with the circuitry may be implemented by, one or more software or firmware modules. In some embodiments, circuitry may include logic, at least partially operable in hardware, to perform the described operations.

Restricting massive MIMO operation to time-division duplex (TDD) significantly alleviates training requirements. As channel reciprocity can be exploited, meaning that the downlink and uplink channels are equal, Channel State Information (CSI) is acquired based on uplink training. The benefit is that training length may be proportional to the number of users.

Millimeter-wave (MmWave) frequencies, for example, in the range of 30 to 60 GHz, may be used in communications involving massive arrays with hundreds of antennas at both ends. The large propagation loss at mmWave frequencies has been identified as a major impediment. Therefore, the priority is a very high beamforming gain between communicating devices. This aim may be achieved by forming a matching transmit beamforming and receive beamforming. Training requirements may become stringent. Unlike massive MIMO systems, the number of antennas at both ends of the communication may now be balanced so that estimating all the channel coefficients may require a training sequence length proportional to the massive number of antennas.

Embodiments are adapted to a concrete communication framework where communication protocols are proposed to support Ping-Pong Beamforming (PPB) in an environment with impairments (noise or interference) and in a single and multi-user context. Different training protocols are described to estimate the beamforming weights at each iteration as well as adaptive modulation and coding. For MIMO communications with a small number of antennas, the application of PPB appears as a reasonable low complexity alternative to find the channel eigenvectors rather than direct channel estimation followed by a singular value decomposition. However, PPB takes on its full potential when applied to communications involving massive arrays at both ends as is expected at mmWave frequencies. First, the training demands can be spectacularly reduced. If both devices have M antennas, the minimal training length for direct channel estimation may be equal to M: it may be the length required to separate the channels from each transmit antennas and, in general, may be augmented to M×L in order to suppress additive noise. Furthermore, being able to track the maximal eigenvectors in mmWave communications is clearly a very valuable asset that has not yet been achieved with such a simplicity.

At each iteration of PPB, the concatenation of the current transmit weights and the channel may be estimated at the receiver. The training period may be divided into (not necessarily subsequent) slots alternatively dedicated to direct and reverse transmission. The training may be entirely dedicated to noise or interference suppression in the single user case as well as user separation in the multi-user case. Only a few tens of iterations may be sufficient for convergence. Hence the training requirements may be much more relaxed compared to direct channel estimation. PPB may come at the cost of a proper training protocol, which is discussed in this paper. Furthermore, PPB may be amenable to a low-complexity implementation particularly critical at mmWave frequencies. Beamforming can be performed in the analog domain and, thereby, reduce the number of RF chains and, in particular, the number of power amplifier and analog-digital converters.

The first part of the description describes a single user set-up. It details the training procedure and performance in data mode when the weight vectors estimated during the training phase are used for data transmission. It analyses the behavior of PPB in the presence of additive noise or interference at the receiver. At MmWave frequencies, very low SNRs may be targeted as beamforming is performed for reach extension. Hence, unless training sequences are very long, the estimation of the beamforming weights at each iteration is likely noisy. As noise is present in the transmit beamforming vectors, there is a risk of noise amplification through the ping-pong process. A very remarkable property of PPB is that noise may be absorbed in the iterative process. Just like PPB transforms a random vector into a maximal eigenvector, PPB can also transform a noise vector into a maximal eigenvector. Intermittent noise disappears after a sufficient number of iterations. A constantly present noise implies a loss in beamforming gain, but the important point is that PPB still converges.

Then the description extends PPB to a multi-user set-up. In the single user case, the maximal eigenvectors may be first estimated followed by maximal eigenmode based data transmission and reception. In a multi-user setting, in principle, keeping such a maximal eigenmode based transceiver leaves inter-user interference and more advanced transceivers are able to suppress inter-user interference. Desired transceivers can be built from the maximal eigenvectors with massive arrays at both ends of the communication. Therefore, the training procedure may be devoted to tracking the eigenvectors for each user using orthogonal training sequences. Thus, embodiments may continue to benefit from the favourable properties of PPB training: convergence, robustness to large noise levels, and very low computational complexity.

In general, described embodiments shift from the usual channel estimation where channel estimates provide the basis to build a transceiver for data mode. Instead, weight vectors may be estimated. As many weight vectors may be estimated as the number of streams to be transmitted, which bypasses the need to estimate many channel coefficients when massive arrays are implicated. The weight vectors are directly used in data mode in a single user set-up, while, in the multi-user set-up, they are generally subject of a simple transformation to insure user separation.

We use the following notations: superscript $(.)^{(k)}$ denotes a quantity at iteration number k while subscript $(.)_A (.)_B$ refer to Device A and B. $(.)^*$, $(.)^T$, $(.)^H$ denote the conjugate, transpose and Hermitian transpose of a matrix. $\|.\|$ is the norm of a vector. $\bar{v}$ denotes a normalized vector.

FIG. 1 illustrates transceiver circuitry of devices A and B in accordance with some embodiments. In particular, FIG. 1 illustrates a transmitter structure for device A, which includes a plurality of antenna elements 104(1) and 104(2) coupled with respective beamformers 108(1) and 108(2). The beamformers 108 may be provided with respective beamforming weight vectors $\bar{w}_A$ as will be described herein.

FIG. 1 also illustrates a receiver structure for device B, which includes a plurality of antenna elements 112(1) and 112(2) coupled with respective combiners 116(1) and 116(2) and beamformers 120(1) and 120(2). The combiners 116 may represent addition of a noise signal, $n_B$, at the receiver and the beamformers 120 may be provided with respective beamforming weight vectors $\bar{w}_B$ as will be described herein.

Though not shown in FIG. 1, device A may also include a receiver structure, similar to that shown for device B, and device B may also include a transmitter structure, similar to that shown for device A.

The system model is described for the single user set-up. The system model for the multi-user set-up is described later.

As shown in FIG. 1, device A is equipped with an array of M antenna elements communicating with device B equipped with an array of N antenna elements. The system operates in TDD mode, so that channel reciprocity holds. Denoting H as the narrowband channel matrix from A to B, reciprocity implies that the channel matrix from B to A is equal to $H^T$. The devices are slowly moving and, unless stated otherwise, the channel coherence time may be assumed larger than the convergence time of the algorithm.

Single data streams may be exchanged between A and B using normalized beamforming weight vectors $\bar{w}_A$ and $\bar{w}_B$, of length M and length N, respectively. The total transmit power $P_T$ is set to 1 at both A and B. At the receiver, independent and identically distributed (i.i.d.) Gaussian noise may be added that is uncorrelated across antennas with variance $\sigma_n^2$. The noise vectors when A or B act as receivers may be denoted as $n_A$ and $n_B$. SNR is defined as $$\rho = \frac{P_T E|h|^2}{\sigma_n^2}$$

where, assuming that the channel is stationary across antennas, $E|h|^2$ denotes the average energy of each individual link. This work typically targets a low SNR range and the role of the multiple antennas is to increase the effective SNR available for communication.

It may rely on the Singular Value Decomposition (SVD) of the channel matrix H:

$$H = U \Lambda V^H = \sum_{i=1}^{N} \lambda_i U_i V_i^H. \qquad (1)$$

The $U_i$'s and $V_i$'s are the columns of matrix U and V, respectively. The singular eigenvalues $\lambda_i$ are ordered as $\lambda_1 \geq \lambda_2 \geq \ldots \geq \lambda_{min(M,N)}$. $\Lambda$ is a diagonal matrix with ith diagonal element equal to $\lambda_i$. For clarity of presentation, alternatively denotes the largest eigenvalue and associated eigenvectors as $\lambda_{max}$, $U_{max}$ and $V_{max}$.

Figure 2:
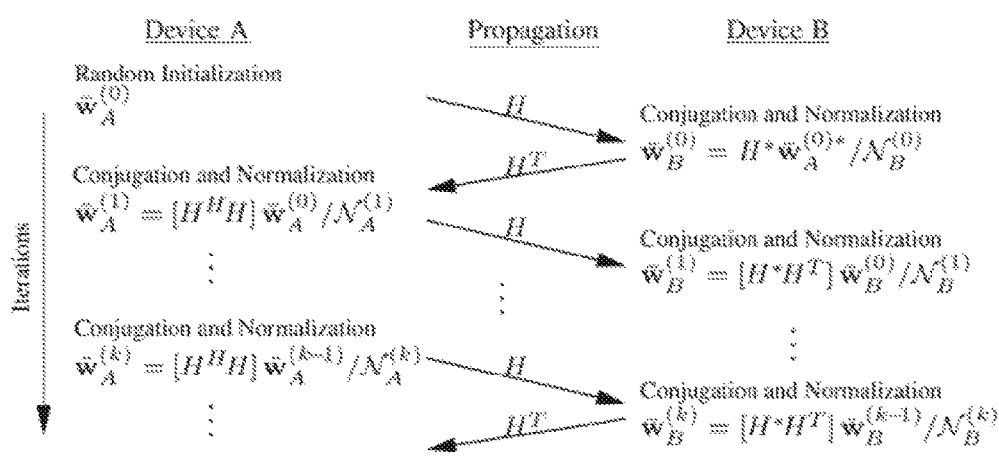
FIG. 2 illustrates iterative processes at device A and device B introduced in FIG. 1 in accordance with some embodiments.

In this section a Noise-free Case of Ping-Pong Beamforming is explained, to understand the intuition behind PPB, an alternating maximization problem in the noise-free case is presented before giving a more formal description of the iterations in FIG. 2. In the noise-free case, a single training symbol s=1 may be sent at each transmission period.

In some embodiments, PPM may be used as an alternating optimization in the following manner.

Starting with an arbitrary normalized weight vector $\bar{w}_A^{(0)}$ at Device A. In training mode, the received signal at B may be $H\bar{w}_A^{(0)}$. This quantity can be seen as the composite channel including the weight vector $\bar{w}_A^{(0)}$ and the propagation channel. The optimal normalized receiver, matched to this composite channel, may be equal to $H^* \bar{w}_A^{(0)*} / N_B^{(0)}$, where $N_B^{(0)}$ is the norm of $H^* \bar{w}_A^{(0)*}$. It may be in turn applied as weight vector for transmission from Device B to Device A.

At device A, the receive signal may be $H^T H^* \bar{w}_A^{(0)*}$, for which the optimal receiver may be $\bar{w}_A^{(1)} = H^H H \bar{w}_A^{(0)} / N_A^{(1)}$. We note that $\bar{w}_A^{(0)H} H^H \bar{w}_A^{(1)} \geq \bar{w}_A^{(0)H} H^T H^* \bar{w}_A^{(0)}$, simply meaning that $\bar{w}_A^{(0)}$ may not be the optimal receiver for the channel $H^T H^* \bar{w}_A^{(0)*}$.

As used herein, "optimal" may refer to a desired parameter for a particular situation. It does not require that the parameter is the most optimal for all situations.

The process previously described can be reformulated in the following optimization framework where the goal is to maximize:

$$\max_{\|w_A\|=1} w_A^H H^H H w_A. \qquad (2)$$

The solution is the maximal eigenvector of $H^H H$ and can be directly computed if the channel matrix is known.

The proposed algorithm finds the maximal eigenvector without the explicit knowledge of the channel by proceeding to ping-pong transmissions that amount to solving (2) using an alternating optimization. Starting from initialization $w_A^{(0)}$, we solve the optimization $\max_{\|w_A\|=1} |w_A^{(0)H} H^H H w_A|$, giving solution $w_A^{(1)}$. Then, a new optimization problem may be formed as $\max_{\|w_A\|=1} |w_A^H H^H H w_A^{(1)}|$. Repetition of this process corresponds to iterations of the algorithm. The cost function may be increased in each iteration and may be upper bounded, so it may converge to a stationary point. The stationary points may be the eigenvectors of $H^H H$.

Provided that the initial weight vector $\underline{w}_A^{(0)}$ is not orthogonal to the maximal eigenvector $V_{max}$, it can be shown that the iterations keep a non-zero component along $V_{max}$. Hence, the algorithm converges to the global optimal, for example, the maximal eigenvector. While the above discussion focuses on the iterations at Device A. The same kind of iterations may occur at Device B.

The PPB iterations may be explained as follows, with the expressions of the transmit weight vectors at device A and Device B at different iterations of the ping-pong beamforming being described in FIG. 2. $N_{A/B}$ is a normalization factor.

There are 2 parallel iteration sets: one set for device A based on composite channel $H^H H$ and one set for device B based on composite channel $H^* H^T$. Each set corresponds to a separate power iteration algorithm: one computing the maximal eigenvector of $H^H H$ and the other one the maximal eigenvector of $H^* H^T$.

A proof of convergence of the power algorithm is briefly described below to better grasp the convergence properties of the algorithm. Again focusing on the iterations at device A, at iteration k, the non-normalized weight vector may be given as:

$$w_A^{(k)} = [H^H H]^k \overline{w}_A^{(0)}, \quad (3)$$

As $H^H H = V \Lambda V^H$ and decomposing $\underline{w}_A^{(0)}$ into the orthogonal basis formed by the eigenvectors $V_i$'s as $\underline{w}_A^{(0)} = \Sigma_{i=1}^M \alpha_i V_i$, we get $H^H H \underline{w}_A^{(0)} = \Sigma_{i=1}^M \lambda_i \alpha_i V_i$. Hence, we obtain:

$$w_A^{(k)} = \sum_{i=1}^M \alpha_i \lambda_i^k V_i. \quad (4)$$

Dividing by $\lambda_{max}^k$:

$$\frac{w_A^{(k)}}{\lambda_{max}^k} = \alpha_1 V_{max} + \sum_{i>1} \alpha_i \left(\frac{\lambda_i}{\lambda_{max}}\right)^k V_i \xrightarrow{k \to \infty} \alpha_1 V_{max} \quad (5)$$

as $(\lambda_i/\lambda_{max})^k$ tend to 0 for i>1, assuming that $\lambda_i$ is strictly smaller than $\lambda_{max}$ the maximum eigenvalue. The speed of convergence may be determined by the ratio between the second largest and largest singular value. Even if the maximal eigenvalue has multiplicity larger than 1, the algorithm may still result in a largest beamforming gain. The only condition for convergence may be that $\alpha_1 \neq 0$, meaning that the initialization may not be orthogonal to the maximal eigenvector.

The implementation of PPB may now be described with respect to various embodiments.

Figure 4:
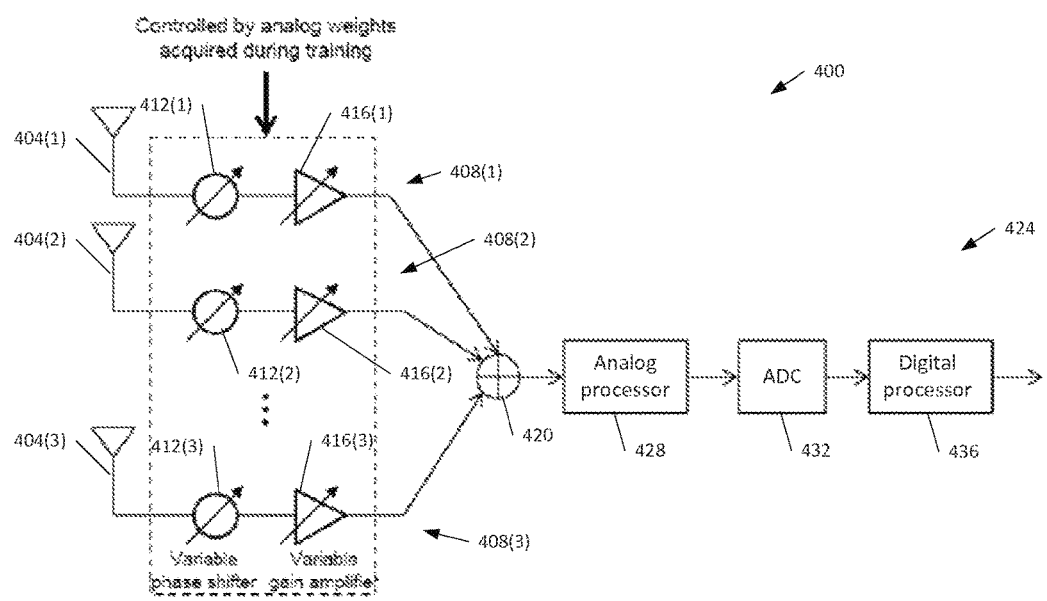
FIG. 4 illustrates a receiver structure in accordance with some embodiments.

One major advantage of PPB is that it is amenable to an effective implementation. FIG. 4 displays a receiver 400 in accordance with some embodiments. The receiver 400 may include a plurality of antennas, 404(1), 404(2), and 404(3), respectively coupled with corresponding analog beamforming components 408(1), 408(2), and 408(3). While three antennas and analog beamforming components are shown, other embodiments may include other numbers of elements. The analog beamforming components 408 may each include a variable phase shifter 412(1), 412(2), 412(3) respectively coupled with a variable gain amplifier 416(1), 416(2), and 416(3). The analog beamforming components 408 may be controlled by analog weights acquired during training and may feed respective signals into a combiner 420 of an RF chain 424. The RF chain 424 may further include an analog processor 428, an analog-to-digital converter (ADC) 432, and a digital processor 436 coupled with each other as shown.

While the figures, including FIG. 4, may show a certain number of elements, other embodiments are not restricted to the number of elements shown.

As shown, beamforming may be performed in the analog domain and only the one RF chain 424 may be needed.

Figure 3:
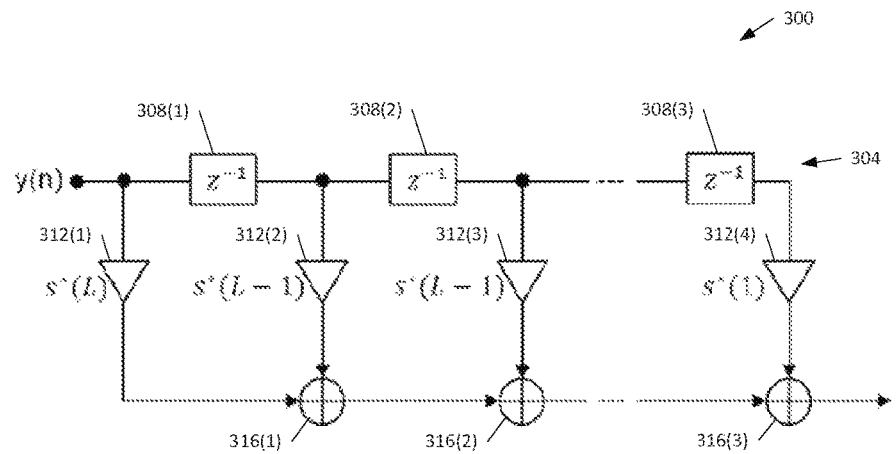
FIG. 3 illustrates training implemented by analog filtering in accordance with some embodiments.

The training procedure described in previous sections, can be implemented using a tap delay analog filter 300 as depicted in FIG. 3 in accordance with some embodiments. The tap delay analog filter 300 may include a delay line 304 having a plurality of delay elements 308 (1), 308(2), and 308(3) to receive a signal y(n). The delay line 304 may be tapped a number of times with amplifiers 312(1) and 312(2) coupled with combiner 316(1); amplifiers 312(3) and 312(4) coupled with combiner 316(2); and The PPB principle may be similar to retrodirective arrays. For example, conjugation operation can be obtained based on van Atta arrays. Retrodirective arrays are passive and their structure needs to be enhanced to allow for data transmission.

Some embodiments include a "ping-pong beam training" method for estimating the beamforming weight vectors used for transmission and reception of a single stream of data between a first device, for example, Device A, and a second Device, for example, device B, in a time division duplexing system. Both devices A and B may have a plurality of antenna elements. The channel matrix from Device A to Device B is denoted as $(H_A)$. The channel matrix from Device B to Device A is denoted as $(H_B)$. The method comprises iterative operations as described below in accordance with some embodiments. While this and other methods may be described in an ordered list, some embodiments may include some or all of the operations performed in a different order.

a) An initial step may include the weights being initialized by randomly chosen values or by using weights given by a previous instantiation of the method. The selected value should be such that the transmit power constraints of the communication systems are satisfied.)
b) At iteration (k), weight vector $(\underline{w}_A^{(k)})$ may be employed to transmit a training sequence from Device A to Device B.
c) Device B may estimate $(H_A \underline{w}_A^{(k)})$, the multiplication of the beamforming vector $(\underline{w}_A^{(k)})$ and the channel $(H_A)$, from the received signals containing the symbols of training sequence using a training based method. The estimate of $(H_A \underline{w}_A^{(k)})$ is denoted as $w_B^{(k)*}$, where $(.)^*$ is the conjugate operation. When the channel is time-variant across the received signals containing the training sequence, the same procedure may be followed assuming the channel is time-invariant. This description is given for a channel $(H_A)$ that is time-invariant across the received signals containing the training sequence. The same procedure may be performed when the channel $(H_A)$ is time-varying.
d) Device B may take the complex conjugate of $(w_B^{(k)*})$ to obtain $(w_B^{(k)})$.
e) Device B may normalize $(w_B^{(k)})$ so that, when the normalized version of $(w_B^{(k)})$ is employed as transmit beamforming weights, the transmit power constraint of the communication system is satisfied. The resulting weights are denoted as $(\underline{w}_B^{(k)})$.
f) Weight vector $(w_B^{(k)})$ may be employed to transmit a training sequence from Device B to Device A.
g) Device A may estimate $(H_B \underline{w}_B^{(k)})$, the multiplication of the beamforming vector $(\underline{w}_B^{(k)})$ and the channel $(H_B)$, from the received signals containing the training sequence using a training based method. The estimate of $(H_B \underline{w}_B^{(k)})$ is denoted as $w_A^{(k)*}$, where $(.)^*$ is the conjugate operation. The description is given for a channel $(H_B)$ that is time-invariant across the received signals containing the training sequence. The same procedure may be performed when the channel $(H_B)$ is time-varying.
h) Device A may take the complex conjugate of $(w_A^{(k)*})$ and obtain $(w_A^{(k)})$.
i) Device A may normalize $(w_A^{(k)})$ so that when the normalized version of $(w_A^{(k)})$ is employed as transmit beamforming weights, the transmit power constraint of the communication system is satisfied. The resulting weights are denoted as $(\underline{w}_A^{(k+1)})$, wherein operations b.-i. are repeated until a criterion is satisfied. At iteration (k) and Device A, one possible convergence criterion may be that the norm of $(w_A^{(k)}))$ be smaller than a predefined threshold. At iteration (k) and Device B, one possible convergence criterion may be that the norm of $(w_B^{(k)})$ be smaller than a predefined threshold. For a reciprocal channel, where $H_A = H_B^T = H$, the method described above may converge to an approximate value of a maximal eigenvector of the Hermitian transpose of the channel matrix (H) multiplied with the channel matrix (H), ($H^H H$), at Device A. The method may converges to an approximate value of conjugate of the channel matrix (H) multiplied with a transpose of the channel matrix (H), ($H^* H^T$), at device (B). In some embodiments, the operation (d) described above may be replaced by the "Device B may take the complex conjugate of $(w_B^{(k)*})$, replace each element of $(w_B^{(k)*})$ by its phase and obtain $(w_B^{(k)})$" and operation (h) may be replaced by "Device A may take the complex conjugate of $(w_A^{(k)*})$, replace each element of $(w_A^{(k)*})$ by its phase and obtain $(w_A^{(k)})$."

Embodiments related to PPB Training and PPB data Mode may now be described.

Transmission protocols may be consistent with the following description.

Figure 5:
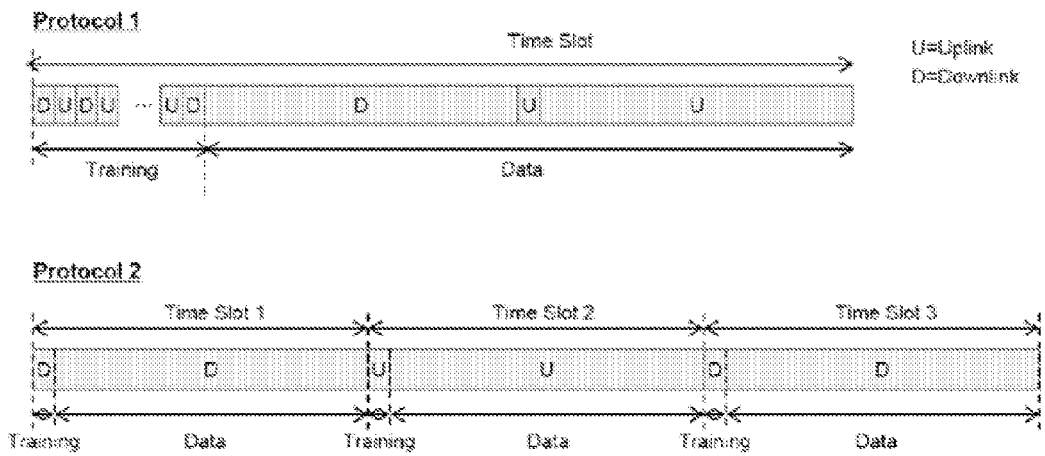
FIG. 5 illustrates two transmission protocols supporting Ping-Pong Beamforming (PPB) in accordance with some embodiments.

There are many possibilities on the way to organize training and data transmission supporting PPB. FIG. 5 displays two different protocols in accordance with some embodiments. In Protocol 1, one time slot may contain a training period followed by uplink and downlink data transmission. At the beginning of each time slot, a training period may be divided into slots that are alternatively dedicated to direct and reverse transmission. Such a training period may be appropriate at the connection initialization. However, if repeated at each transmission slot, such procedure could become inefficient as guard time intervals occur between UL and DL transmissions. Protocol 2 avoids this problem by having one time slot dedicated to one given transmission direction, including the training sequence. The current training slot uses the weights acquired during the previous time slot as initialization. This protocol may be adapted to slowly varying channels. In practice, the protocol adopted could be a compromise between both models, including the number of training sub-slots in each time slot or the length of the data slots, depending on the mobility of the users, the data traffic, etc.

In an embodiment wherein Protocol 2 is applied, one time slot may be dedicated to both transmission directions.

In the reminder of the description, Protocol 2 is used the various embodiments, showing the performance in data mode as PPB converges. However, embodiments are not limited to the use of Protocol 2.

An embodiment using a protocol where the training method is associated to data communications, for example, Protocol 2, may be described as follows. The protocol may include a plurality of time slots, with each time slot successively including a training period and a data mode. The training period may be initialized as described or by a weight vector acquired during a previous time slot. If the training period begins by a transmission from Device A to Device B, the initialization may be provided by the last updated weight vector $(\underline{w}_A^{(k)})$, where (k) is the last iteration number of the training method described during the previous time slot. If the training period begins by a transmission from Device B to Device A, the initialization may be provided by the last updated weight vector $(\underline{w}_B^{(k)})$.

A training procedure may be performed during the training period, followed by a data transmission being performed in the same direction of the last transmission during the training period.

PPB training may be performed as follows.

Consider the received signal at Device A. Training may be performed in a similar way in the reverse direction at Device B. The iteration index k may be dropped and the weights applied at Device A and B may be denoted generically as $\underline{w}_A$ and $\underline{w}_B$, respectively.

In an embodiment, to suppress noise, Device B sends a training sequence, s(n), of length L, $s = [s(1)\ s(2) \ldots s(L)]^T$, verifying $s^H s = L$. The transmitted vectorial signal at time n is $\underline{w}_B s(n)$. Corresponding to the transmission of the L training symbols, Device A receives L vectorial signals that are grouped in an M×L matrix $Y_A^{ts}$:

$$Y_A^{ts} = H^T \overline{w}_B s^T + N_A^{ts}, \quad (6)$$

where $N_A^{ts}$ groups the L additive noise vectors.

The non-normalized weight vector $w_A$ is an estimate of $H^H \underline{W}_B^*$ obtained as:

$$w_A = Y_A^{ts*} s^H / L = H^H \overline{w}_B^* + N_A^{ts*} s^H / L. \quad (7)$$

The variance of the error on each element of $w_A$ is $\sigma_n^2/L$. Depending on the length of the training sequence, the residual noise could have an influence on the convergence of the algorithm, especially if a very low SNR range is targeted.

The following equivalent simplified model may be used in some embodiments. It may be assumed that a single training symbol equal to 1 is sent.

$$w_A = H^H \overline{w}_B^* + n_A^{ts}, \quad (8)$$

where $n_A^{ts} \approx CN(0, \sigma_{ts}^2/L)$ with $\sigma_{ts}^2 = \sigma_n^2/L$.

In some embodiments a training procedure to estimate the multiplication of the beamforming vector $(\underline{w}_A^{(k)})$ and the channel ($H_A$) at Device B in operation (c), described above, is used, or of the multiplication of the beamforming vector $(\underline{w}_B^{(k)})$ and the channel ($H_B$) at Device A in operation (g), described above, implemented using the analog linear filter 300 of FIG. 3, where the coefficients of the analog filter are based on the values of the symbols in the training sequence. The filter is described as $(s^*(L) + s^*(L-1)z^{-1} + \ldots s^*(1)z^{-(L-1)})$ where ($z^{-d}$) represents the delay operation by d time samples. The training sequence is the sequence of symbols (s (1), s(2), . . . s(L−1), s(L)), where (L) is the training sequence length, sent from the transmitting device. The inputs of the filter are the L received signals containing the symbols of the training sequence. At iteration (k) and at the receiving device, the (L) received vectorial signals containing symbols from the training sequence are $\{y(i), i=1, 2, \ldots, L-1, L\}$. At iteration k, the estimate of the transmit beamforming vector and the channel from the transmitter to the receiver is the $L^{th}$ output of the filter.

PPB data mode and performance metrics may now be described.

In PPB data mode, Device B may send data symbol s using weight vector $\overline{w}_B$, estimated during the training sequence. We may assume $E|x|^2 = 1$. The received signal at device A is:

$$y_A^d = H^T \overline{w}_B x + n_A^d. \quad (9)$$

The normalized matched filter $\overline{w}_A = H^H \overline{w}_B^* + n_A^{ts}$, estimated during the training sequence as in Equation (8), may be applied to recover the transmitted symbol as:

$$\overline{w}_A^T y_A^d = \overline{w}_A^T (H^T \overline{w}_B x + n_A^d). \quad (10)$$

As the variance of the noise term $\overline{w}_A^T n_A^d$ remains constant and equal to $\sigma_n^2$, the metric may be the variance of the signal part: $|\overline{w}_A^T H^T \overline{w}_B|^2$.

Using channel reciprocity, the modulation and level coding can be predicted at Device B as follows. The SNR at receiver A is $\overline{w}_B^H H^* H^T \overline{w}_B / \sigma_n^2$, which may be predicted using the non-normalized vectors $w_B$ as $w_B^H w_B / \sigma_n^2$. The noise variance may be assumed to be perfectly estimated. In general, this SNR prediction may underestimate the actual SNR.

Next, the metric may be examined when M is asymptotically large to isolate an effect of the noise in the beamforming weight estimation. Recalling that $\overline{w}_A = (H^H \overline{w}_B^* + n_A^{ts}) / \|H^H \overline{w}_B^* + n_A^{ts}\|$, the two following results are used:
$n_A^{aH} H^T / M \to 0$
$PH^T \overline{w}_B + n_A^{ts} P^2 / M \to \overline{w}_B^H H^* H^T \overline{w}_B + M \sigma_{ts}^2$
The performance metric can be rewritten as:

$$|\overline{w}_A^T H^T \overline{w}_B|^2 = \frac{w_B^H H^* H^T \overline{w}_B}{1 + \frac{M \sigma_{ts}^2}{\overline{w}_B^H H^* H^T \overline{w}_B}}. \quad (11)$$

As a simple illustration, we take the case where Device A comprises a large number of antennas, while Device B comprises one single antenna, so that $\overline{w}_B = 1$ and H is a row vector. According to the law of large numbers, $H^* H^H / M$ tends to $E|h|^2$ (we recall that $E|h|^2$ denotes the average energy of each individual channel). Thus, the following is obtained:

$$|\overline{w}_A^T H^T \overline{w}_B|^2 : ME|h|^2 \frac{1}{1 + \sigma_{ts}^2 / E|h|^2}. \quad (12)$$

When the channel vector H is known, the beamforming gain with respect to single antenna reception is M. In our case, the beamforming gain may be degraded and may equal $M/(1+\sigma_n^2/E|h|^2)$. When the average SNR per link $E|h|^2/\sigma_{ts}^2$ is 0 dB, the degradation due to noise forwarding is of 3 dB. At high SNR, the beamforming gain tends to the maximal gain. This degradation can be suppressed if a sufficiently long training sequence is sent during each transmission slot as $\sigma_n^{ts}$ tends to 0.

When additive noise or an interfering signal is present at the receiver, it may get embedded in the weight vector. As a new noise is added at each iteration, the risk is a noise amplification that would flood the beamforming weights to determine. The effect of the noise may be analysed to show how it is actually absorbed by the iterative process.

Figure 6:
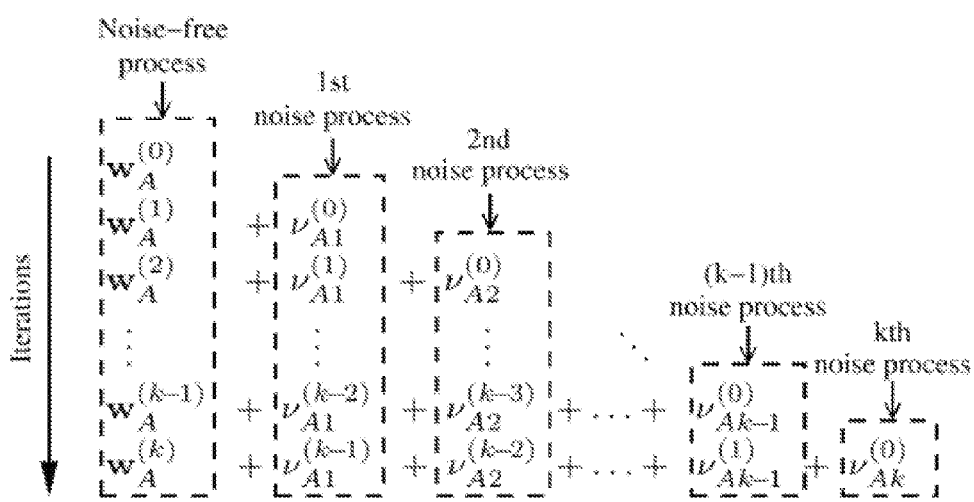
FIG. 6 illustrates an iterative process at a device in a noisy case in accordance with some embodiments.
Figure 6B:
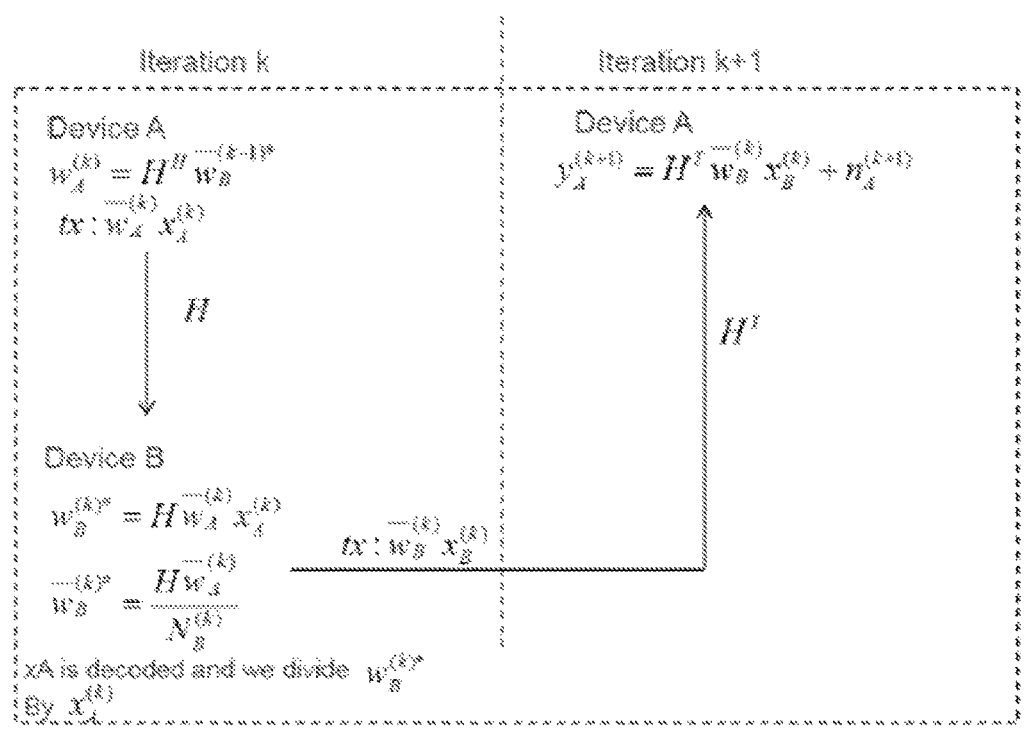
FIG. 6B shows an iterative process introduced in FIG. 6 in more detail in accordance with some embodiments.

As noise is added at each iteration, the iterative process becomes quite involved. It is helpful to identify the underlying structure of the process and isolate the noise contribution. In this perspective, the iterative process is decomposed as in FIG. 6 in accordance with some embodiments.

Each line describes the structure of the beamforming weight at Device A. To simplify, the weights are not normalized. At iteration k, the total weight factor $\overline{w}_A^{(k)}$ is decomposed as noise-free term $w_A^{(k)}$ and noise terms:
$w_A^{(k)}$: non-normalized process as it would happen without noise. $w_A^{(0)} = \overline{w}_A^{(0)}$ and $w_A^{(k)} = [H^H H] w_A^{(k-1)}$.
The $j^{th}$ noise process starts at iteration j and is initiated as $v_{Aj}^{(j)} = H^H n_B^{(j-1)} N_A^{(j-1)} + n_A^{(j)} N_B^{(j-1)}$. The general term at iteration k is $v_{Aj}^{(k-1)} = [H^H H] v_{Aj}^{(k-j-1)}$.

The description above clearly indicates that the noise processes follow the same kind of iterative process as the noise-free process $w_A$. Each noise process, on its own, converges to the maximal eigenvector of $H^H H$. At iteration k, the $j^{th}$ process $v_{Aj}^{(k-j)}$ has performed k–j iterations. Its state of convergence is not as advanced as the basic process $w_A$: for example, at the $k^{th}$ iteration, the $k^{th}$ noise process is just initiated. The noise processes that have converged at iteration k do not contribute to estimation errors of the beamforming vector. The noise processes that have not converged at iteration k may contribute to the estimation errors. The noise processes initiated at iteration k may be the ones contributing the most. The observation of the noise processes suggest a training procedure at low SNR where the training length increases as the iterations increase, so that a stronger averaging of the noise is obtained near the convergence point.

A general expression of the solution after convergence of the basic process $w_A$ may be as follows:

$$\overline{w}_A^{(k)} = \beta V_{max} + \sqrt{1 - \beta^2} V, \quad (13)$$

where $0 < \beta < 1$ and V comprises zero-mean noise terms orthogonal to $U_{max}$. There are two perturbing factors: a bias and noise.

It is observed through simulations that the overall process converges on average, where the average is taken over noise.

In some embodiments, the ping pong beam training may be established in a multi-user MIMO setup, wherein Device A is base station and the at least one second device, for example, Device B, is at least one user.

Multi-user MIMO set-up is considered where one base station simultaneously serves multiple users. One single stream of data is sent to or received at a given user. The focus remains on a scenario where both base station and user devices are equipped with a very large number of antennas, targeting mm-wave communications.

The ability to track the maximal eigenvector of a large MIMO channel is desired and is the feature that is preserved in the extension of PPB to the multi-user set-up. Similarly to the single user case, the training mode and data mode may be distinguished as follows.

In training mode, parallel tracking of the maximal eigenvectors of each user channel may be performed. This may be enabled by the use of one orthogonal training sequence per user.

In data mode, transmit and receive beamforming at the base station and the user devices may be designed based on estimates of the maximal eigenvectors to account for inter-user interference at the devices.

The time slot adopted corresponds to Protocol 2 shown in FIG. 5.

The above discussion may be extended to the multi-user case as will be described in some embodiments. Device A may refer to a base station and $B_p$ may refer to the different users, where p is the user index. We assume that the number of users P is much smaller than the number of antennas at the base station. $H_p$ is the channel from the base station to user p. The reciprocal channel is $H_p^T$. The coefficients of the channels may be assumed to be i.i.d. $\rho = P_T E|h|^2 / \sigma_n^2$ may be assumed the same for each user, where $P_T$ is the total transmit power, $E|h|^2$ is the variance of each single channel and $\sigma_n^2$ is the variance of the noise at each receive antenna. M is the number of antennas at the base station and, to simplify, all users may have the same number of antennas denoted as N.

The weights estimated during the training phase and the weights applied in data mode may be different. Distinctions between these weights may be noted as follows.

In the training mode, $\overline{w}_{A_p}$ is the beamforming vector corresponding to user p estimated at the base station; $\overline{w}_{B_p}$ is the beamforming vector corresponding to user p estimated at user p; and $\overline{w}_{A_p}$ and $\overline{w}_{B_p}$ converge to the right and left maximal eigenvectors of $H_p$.

In the data mode, $\overline{v}_{A_p}^{tx/rx}$ is the beamforming vector applied at the base station to transmit to or receive signals from user p; and $\overline{v}_{B_p}^{tx/rx}$ is the beamforming vector applied at user p to transmit to or receive signals from the AP.

The iteration index k may be dropped when referring to a given iteration.

The transmit power at the base station may be limited to 1 and equal power allocation may be assumed so that $\|\overline{w}_{A_p}\|^2=1/P$. At the user, the transmit power may be limited to $1/P$, meaning $\|\overline{w}_{A_p}\|^2=1/P$, so that the total transmit power in downlink and uplink is the same. This may provide a duality in the performance between UL and DL. The same normalization may be applied to $\overline{v}_{A_p}$ and $\overline{v}_{B_p}$.

In the training mode, the tracking of the eigenvectors may be performed as follows.

To estimate the beamforming vectors $\overline{w}_{A_p}$ and $\overline{w}_{B_p}$, one orthogonal sequence per user may be employed which is denoted as $s_p=[s_p(1)\ s_p(2)\ldots s_p(L)]^T$ and has length L with properties $s_p^H s_p=L$ and $s_p^H s_q=0$, $p\neq q$.

In downlink (DL), the transmitted vectorial signal at time n is $\Sigma_{p=1}^{P}\overline{w}_{A_p}s_p(n)$. At user p, the L vectorial received signals may be grouped in the N×L matrix $Y_{B_p}^{ts}$:

$$Y_{B_p}^{ts} = \sum_{q=1}^{P} H_p \overline{w}_{A_q} s_q^T + N_{Bp}^{ts}. \quad (14)$$

$Y_{B_p}^{ts}$ is multiplied by $s_p^*$ to isolate the contribution from user p and suppress the noise. The non-normalized beamforming vector $w_{B_p}$ is an estimate of $H_p^* \overline{w}_{A_p}^*$ and is equal to:

$$w_{B_p} = Y_{B_p}^{ts*} s_p/L = H_p^* \overline{w}_{A_p}^* + N_{B_p}^{ts*} s_p/L. \quad (15)$$

In uplink (UL), user p transmits $\overline{w}_{B_p} s(n)$ at time n, so that the matrix of received signals at the base station is:

$$Y_A^{ts} = \sum_{q=1}^{P} H_q^T \overline{w}_{B_q} s_q^T + N_A^{ts}. \quad (16)$$

Similarly to DL, the user contributions may be separated thanks to training sequence orthogonality, resulting in the following expression for $w_{A_p}$:

$$w_{A_p} = Y_A^{ts*} s_p/L = H_p^H \overline{w}_{B_p}^* + N_A^{ts*} s_p/L. \quad (17)$$

In the noiseless case, after a sufficient number of ping-pong transmissions, PBB converges to $V_{max}^p$ at the base station and $U_{max}^{p*}$ at user p.

A second aspect of the present disclosure may include a method for estimating the beamforming weight vectors used for transmission and reception of several streams of data between one first device, for example, device A, and several devices, for example, devices $B_p$, in a time division duplexing system. One stream of data may be transmitted between device A and one given device $B_p$. All devices (A and $B_p$) may have a plurality of antenna elements. The channel matrix from device A to device $B_p$ is denoted as $H_{A_p}$. The channel matrix from device $B_p$ to device A is denoted as $H_{B_p}$. The method comprises iterative operations as described below in accordance with some embodiments.

a) One training sequence ($s_p$) may be assigned for estimating the beamforming weight vectors used in the communication between device A and a given device $B_p$. In one possible design, all the training sequences ($\{s_p, p=1,\ldots, P\}$) may be mutually orthogonal, where P is the number of users.

b) The weights vectors may be initialized by randomly chosen values or using the weights given by a previous instantiation of the method. The selected value should be such that the transmit power constraints of the communication systems are satisfied.

c) At iteration (k), weight vector ($\overline{w}_{A_p}^{(k)}$) may be employed to transmit the training sequence ($s_p$) from device (A) to device ($B_p$).

d) Device $B_p$ may estimate ($H_{A_p}\overline{w}_{A_p}^{(k)}$), the multiplication of the beamforming vector ($\overline{w}_{A_p}^{(k)}$) and the channel ($H_{A_p}$) from the received signals containing the symbols of training sequence using a training based estimation method. The estimate of ($H_{A_p}\overline{w}_{A_p}^{(k)}$) is denoted as $w_{B_p}^{(k)*}$, where $(.)^*$ is the conjugate operation. This description is given for channels ($H_{A_p}$) that are time-invariant across the received signals containing the training sequence. The same procedure may be performed when the channel ($H_{A_p}$) is time-varying.

e) In one instantiation, Device $B_p$ may estimate all ($\{H_{A_q}\overline{w}_{A_q}^{(k)}, q=1,\ldots, P\}$), the multiplication of the beamforming vector ($\overline{w}_{A_q}^{(k)}$) and the channel ($H_{A_q}$) from the received signals containing the symbols of the training sequence using a training based estimation method.

f) Device $B_p$ may take the complex conjugate of ($w_{B_p}^{(k)*}$) and obtain ($w_{B_p}^{(k)}$).

g) Device ($B_p$) may normalize ($w_{B_p}^{(k)}$) so that, when the normalized version of ($w_{B_p}^{(k)}$) is employed as transmit beamforming weight vector, the transmit power constraint of the communication system is satisfied. The resulting weights are denoted as ($\overline{w}_{B_p}^{(k)}$).

h) Weight vector ($\overline{w}_{B_p}^{(k)}$) may be employed to transmit a training sequence from device $B_p$ to device A.

i) Device A may estimate all ($\{H_{B_p}\overline{w}_{B_p}^{(k)}, p=1,\ldots, P\}$), all the concatenations of the beamforming vectors ($\overline{w}_{B_p}^{(k)}$) and the channel ($H_{B_p}$) from the received signal containing the symbols of the training sequences using a training estimation based method. The estimate of ($H_{B_p}\overline{w}_{B_p}^{(k)}$) is denoted as $w_{A_p}^{(k)*}$, where $(.)^*$ is the conjugate operation. This description is given for channels ($H_{B_p}$) that are time-invariant across the received signals containing the training sequence. The same procedure is performed when the channel ($H_{B_p}$) is time-varying.

j) Device A may take the complex conjugate of all ($\{w_{A_p}^{(k)*}, p=1,\ldots, P\}$) and obtain ($\{w_{A_p}^{(k)}, p=1,\ldots, P\}$).

k) Device A may normalize all the ($w_{A_p}^{(k)}$), $p=1,\ldots, P$ so that when the normalized version of all the ($w_{A_p}^{(k)}$), $p=1,\ldots, P$ is employed as transmit beamforming weight vectors, the transmit power constraint of the communication system is satisfied. The resulting weightvectors are denoted as ($\{w_{A_p}^{(k+1)}, p=1,\ldots, P\}$).

Operations (a) to (i) may be repeated until a convergence criterion is satisfied. At iteration (k) and device A, one possible convergence criterion is that the norm of all the ($w_{A_p}^{(k)}$) be smaller than a predefined threshold. At iteration k and device B, one possible convergence criterion is that the norm of ($w_{B_p}^{(k)}$) be smaller than a predefined threshold.

For a reciprocal channel, $H_{A_p}=H_{B_p}^T=H_p$ and the method may converge to an approximate value of a maximal eigenvector of a Hermitian transpose of the channel matrix ($H_p$) multiplied with the channel matrix $H_p$, ($H_p^H H_p$) at device A. The method may converge to an approximate value of conjugate of the channel matrix ($H_p$) multiplied with a transpose of the channel matrix ($H_p$), ($H_p^* H_p^T$) at device $B_p$.

In an embodiment the previous mentioned protocols are applied.

In embodiments of the second aspect, the training procedure, in the case where the training sequences assigned to all users are mutually orthogonal, to estimate the multiplication of the beamforming vector $\overline{w}_{A_p}^{(k)}$ and the channel $H_{A_p}$ at device $B_p$ or the multiplication of the beamforming vector $\overline{w}_{B_p}^{(k)}$ and the channel $H_{B_p}$ at device A may be implemented using an analog linear filter as depicted in FIG. 3. The coefficients of the analog filter may be based on the values of the symbols in the training sequence $s_p$ assigned to user p. The filter may be described as $(s_p^*(L)+s_p^*(L-1)z^{-1}+ \ldots s_p^*(1)z^{-(L-1)})$ where $Z^{-d}$ represents the delay operation by d time samples. The training sequence is the sequence of symbols $(s_p(1), s_p(2), \ldots s_p(L-1), s_p(L))$, where (L) is the training sequence length, assigned to the communication between device A and device $B_p$. The inputs of the filter are the L received signals containing the symbols of the training sequences. At iteration k and at the receiving device, the L received vectorial signals containing symbols from the training sequence are $\{y(i), i=1, 2, \ldots, L-1, L\}$. At iteration k, the estimate of the transmit beamforming vector and the channel from the transmitter to the receiver is the $L^{th}$ output of the filter.

In embodiments of the second aspect, the weights estimated during the training phase may be employed in the data phase as either of the following options, where $\overline{w}_A$ and $\overline{w}_B$ denote the weights obtained during the training phase.

In the first option, when device A is the transmitter and devices $B_p$ are the receivers, $\overline{w}_{A_p}$ is the beamforming vector used to transmit the data to device $B_p$ such that the transmit signals from all transmit antennas written as a vector are $\overline{w}_{A_1}x_1+ \ldots +\overline{w}_{A_P}x_P$ where $x_p$ is the symbol sent from device A to device $B_p$ and $\overline{w}_{A_p}x_p$ is the multiplication of vector $\overline{w}_{A_p}$ and $x_p$. Beamforming vector $\overline{w}_{B_p}$ is applied to the received signal vector to recover the data intended to device $B_p$: denoting as $Y=[y(1) \ldots y(N_p)]^T$ a vector containing the signals from the $N_p$ received signals at the $N_p$ antennas of device $B_p$, decoding of symbol $x_p$, is based on $\overline{w}_{B_p}^T Y$.

In the first option, when device $B_p$ is the transmitter and device A is the receiver, $\overline{w}_{B_p}$ is the beamforming vector used to transmit the data from device $B_p$ to device A such that the transmit signals from all transmit antennas written as a vector are $\overline{w}_{B_p}x_p$ where $x_p$ is the symbol sent from device $B_p$ to device A and $\overline{w}_{B_p}x_p$ is the multiplication of vector $\overline{w}_{B_p}$ and $x_p$. Beamforming vector $\overline{w}_{A_p}$ is applied to the received signal vector to recover the data sent from device $B_p$: denoting as $Y=[y(1) \ldots y(M)]^T$ a vector containing the signals from the M received signals at the M antennas of device A, decoding of symbol $x_p$ is based on $\overline{w}_{A_p}^T Y$.

In the second option, when device A is the transmitter and devices $B_p$ are the receivers, $\overline{w}_{A_p}$ is the beamforming vector used to transmit the data to device $B_p$ as described in the first option. Beamforming vector $\overline{v}_{B_p}$ is applied to the received signal vector to recover the data intended to device $B_p$ as described in claim 0. $\overline{v}_{B_p}$ is a zero-forcing beamforming vector built from the set $\{\overline{w}_{B_q}, q=1, \ldots P\}$, verifying $\overline{w}_{Bq}^T \overline{v}_{B_q}$, p≠q.

In the second option, when devices $B_p$ are the transmitters and device A is the receiver, $\underline{w}_{B_p}$ is the beamforming vector used to transmit the data from device $B_p$ as described in claim 0. Beamforming vector $\overline{v}_{A_p}$ is applied to the received signal vector to recover the data sent from device $B_p$ as described in claim 0. $\overline{v}_{A_p}$ is a zero-forcing beamforming vector built from the set $\{\overline{w}_{A_q}, q=1, \ldots P\}$, verifying $\underline{w}^T_{A_q} \overline{v}_{A_p}$, p≠q.

The procedure described in the second option may rely on the estimation of all $\{\overline{w}_{B_q}, q=1, \ldots P\}$ at device $B_p$.

In a third option, when device A is the transmitter and devices $B_p$ are the receivers, $\overline{v}_{A_p}$ is the beamforming vector used to transmit the data to device $B_p$ as described in claim 0. $\overline{v}_{A_p}$ is a zero-forcing beamforming vector built from the set $\{\overline{w}_{A_q}, q=1, \ldots P\}$, verifying $\overline{w}^T_{A_q}\overline{v}_{A_p}$, p≠q. Beamforming vector $\overline{v}_{B_p}$ is applied to the received signal vector to recover the data intended to device $B_p$ as described in the first option. $\overline{v}_{B_p}$ is a zero-forcing beamforming vector built from the set of $\{\overline{u}_{A_q}, p=1, \ldots P\}$, verifying $\overline{v}_{B_p}^T \overline{u}_{A_q}$, p≠q. $\overline{u}_{A_p}$ is an estimate of $H_A \overline{u}_{A_p}$ obtained by training.

In the third option, when devices $B_p$ are the transmitters and device A is the receiver, $\overline{w}_{B_p}$ is the beamforming vector used to transmit the data from device $B_p$ as described in claim 0. $\overline{w}_{B_p}$ is the beamforming vector used to transmit the data from device $B_p$ as described in claim 0. Beamforming vector $\overline{v}_{A_p}$ is applied to the received signal vector to recover the data sent from device $B_p$ as described in claim 0. $\overline{v}_{A_p}$ is a zero-forcing beamforming vector built from the set of $\{\overline{w}_{A_q}, q=1, \ldots P\}$, verifying $\overline{w}_{A_q}^T \overline{v}_{A_p}$, P≠q.

The procedure described in the third option may rely on the estimation of all $\{\overline{u}_{A_p}, p=1, \ldots P\}$ that use an additional training sequence.

A fourth option may include a transceiver similar to the second and third options where the beamforming weight vector following a zero-forcing design follows instead a minimum mean square error design.

Some embodiments may include transceiver Structures with knowledge of channel.

To justify the design for the transmit and receive beamformers in data mode, the performance of three transceiver structures should be assessed assuming that the channel matrix is known. The first transceiver structure may be one based on maximal eigenmode transmission, which may be referred to as matched filtering (MF). The second transceiver structure may be one based on zero-forcing (ZF) filtering at the transmitter. The third transceiver structure may be one based on zero-forcing filtering at the receiver. As the channel matrix is known so are the left and right maximal eigenvectors of $H_p$ denoted as $U_{max}^P$, and $V_{max}^P$.

Each of the transceiver structures can be implemented in different embodiments.

Consider first, a maximal eigenmode transmission in the DL direction, for example, by the first transceiver structure. Transmit filter $V_{max}^P/\sqrt{P}$ may be employed at the base station to carry the data to user p and receive filter $U_{max}^{P*}$ maybe employed to recover the data at user p. Those filters would be the optimal ones in the single user case. The results discussed in this section are similar in the UL direction. The transmitted signal is:

$$\frac{1}{\sqrt{P}}\sum_{q=1}^{P} V_{max}^q x_q,$$

where $x_q$ is the symbol sent to user p. Assume that $E|x_q|^2=1$ and symbols to different users are uncorrelated. Isolating the signal of interest and the inter-user interference, the received signal at user p is:

$$y_{B_p}^d = \frac{1}{\sqrt{P}}\lambda_{max}^p U_{max}^p x_p + \frac{1}{\sqrt{P}}\sum_{q\neq p}^{P} H_p V_{max}^q x_q + n_{B_p}^2. \quad (18)$$

After receive matched filtering by $U_{max}^{pH}$, we obtain:

$$U_{max}^{pH} y_{B_p}^d = \quad (19)$$

$$\frac{1}{\sqrt{P}}\lambda_{max}^p x_p + \frac{1}{\sqrt{P}}\sum_{q\neq p}^{P} \lambda_{max}^p V_{max}^{pH} V_{max}^q x_q + U_{max}^{pH} n_{B_p}^d. \quad (20)$$

Consider an asymptotic number of antennas M and N, where M and N are of the same order. $\lambda_{max}^{p}$ scales as $O(\sqrt{M}+\sqrt{N})$. Resorting to the central limit theorem, $V_{max}^{pH}V_{max}^{q}$ scales as $O(1/\sqrt{M})$, so $\lambda_{max}^{p}V_{max}^{pH}V_{max}^{q}$ scales as $O(1)$. $U_{max}^{pH}n_{B_p}^{d}$ scales as $O(\sigma_n^2)$.

One first observation is that the inter-user interference and noise terms are much smaller than the signal part. When N is small, the interference term becomes negligible with respect to the noise term, except at high SNR. Performance is limited by the noise. The resulting post-processing SNR for user p is:

$$SNR_p^{MF} = \frac{\lambda_{max}^{p2}/P}{\sum_{q \neq p}^{P} \lambda_{max}^{p2}|V_{max}^{pH}V_{max}^{q}|^2/P + \sigma_n^2}. \quad (21)$$

The SNR scales as $O(\sqrt{M}+\sqrt{N})$. At high SNR $\rho$, performance is clearly limited by inter-user interference. At low SNR $\rho$, which is the SNR range of highest interest in this work, the inter-user interference is of the same order as the noise variance. The presence of the inter-user interference could cause a degradation in SNR of several dB. Therefore, it is desirable to implement a more sophisticated transceiver structure to be able to suppress the inter-user interference as presented in the next section.

Next, consider a zero-forcing filtering transmission in the DL direction, for example, by the second transceiver structure. Examining a solution for DL where ZF filtering is applied at the base station while matched filtering is applied at the receiving user:

$$\overline{v}_{A_p} = \frac{1}{\sqrt{P}} \frac{P_{V_{max}^{p}}^{\perp} V_{max}^{p}}{\sqrt{V_{max}^{pH} P_{V_{max}^{p}}^{\perp} V_{max}^{p}}} v_{B_p} = U_{max}^{p*}, \quad (22)$$

where $V_{max}^{p}$ is a M×(P−1) matrix with columns spanning the set $\{V_{max}^{q}, q \neq p\}$, for example, the set of all maximal eigenvectors except for $V_{max}^{p}$. $P_X^{\perp}=I-X(X^HX)^{-1}X^H$ is the orthogonal projection into the space orthogonal to the columns of matrix X. Inter-user interference gets eliminated and the received signal at user p after matched filtering is:

$$U_{max}^{H}y_{B_p}^{d} = \frac{1}{\sqrt{P}} \frac{1}{\sqrt{V_{max}^{pH}P_{V_{max}^{p}}^{\perp}V_{max}^{p}}} U_{max}^{H}H_p P_{V_{max}^{p}}^{\perp} V_{max}^{p}x_p + \quad (23)$$

$$U_{max}^{H}n_{B_p}^{d}$$

$$= \frac{\lambda_{max}^{p}}{\sqrt{P}}\sqrt{V_{max}^{pH}P_{V_{max}^{p}}^{\perp}V_{max}^{p}} x_p + U_{max}^{H}n_{B_p}^{d} \quad (24)$$

The post-processing SNR for user p is:

$$SNR_p^{ZF1} = \frac{\lambda_{max}^{p2}/P}{\sigma_n^2}\left[1 - \sum_{q \neq p}|V_{max}^{qH}V_{max}^{p}|^2\right] \xrightarrow{M \to \infty} \frac{\lambda_{max}^{p2}/P}{\sigma_n^2}. \quad (25)$$

When the number of antennas at the base station is asymptotically large, this structure may be desired in the sense that we obtain the maximal SNR per user. This structure may be referred to as ZF1.

In an alternative transceiver structure, denoted as ZF2, for example, the third transceiver structure, the role of the filters is switched: matched filter is applied at the transmitter and ZF at the user:

$$\overline{v}_{A_p} = \frac{1}{\sqrt{P}}V_{max}^{p} \ v_{B_p} = P_{H_p V_{max}^{p}}^{\perp} H_p^* V_{max}^{p*}. \quad (26)$$

The post-processing SNR can be written as:

$$SNR_p^{ZF2} = \frac{\lambda_{max}^{p2}/P}{\sigma_n^2}\left[1 - \frac{\sum_{q \neq p}^{P}\lambda_{max}^{p2}|V_{max}^{qH}V_{max}^{p}|^2}{\sum_{j=1}^{R_p}\sum_{q \neq p}\lambda_j^{p2}|V_{max}^{qH}V_j^{p}|^2}\right] \quad (27)$$

where $R_p$ is the rank of channel matrix $H_p$. To simplify, assume M=N and $R_p$=M.

$$\lambda_j^{p2}|V_{max}^{qH}V_j^{p}|^2$$

scales as $O(1)$. Hence, the numerator in Equation 27 is of order $O(1)$ while the numerator is of order $O(M)$. Hence, the post-processing SNR tends to $$\frac{\lambda_{max}^{p2}/P}{\sigma_n^2}$$

and the structure may also be desired. Note that when only M is asymptotically large and N is small, the fraction within the bracket in Equation 27 is of order $O(1)$. ZF2 may no longer be desired while ZF1 remains desired.

In the UL direction, $U_{max}^{q*}/\sqrt{P}$ is applied at user p to transmit its data while a ZF receiver is applied at the AP. The desired receiver may be $V_{max}^{q}$, leading to the desired post-processing SNR.

Performance in the data mode may be evaluated as follows.

Like in the single user case, the performance in data mode may be assessed assuming the second time slot model of FIG. 5. The three transceiver structures MF, ZF1 and ZF2 may be tested based on the current values of $w_{A_p}$ and $w_{B_p}$. For ZF1, while PPB has not converged, a receive matched filter at the user is suboptimal, so a ZF receiver is employed. In the DL direction, the user receives the concatenation of the transmit zero-forcing filter and the channel. This quantity has to be estimated. Hence, an additional training sequence may be necessary. This is the main disadvantage of ZF1. The advantage of MF compared to ZF1 and ZF2, is that the filters acquired during the training phase can be directly used in data mode, while ZF1 and ZF2 use the computation of the zero-forcing filter. In table 1, the weight vectors applied in uplink and downlink are summarized.

TABLE 1

Beamforming weights in data mode for the MF, ZF1 and ZF2 transceivers. ZF({$\bar{x}_p$}) designates the ZF filter built from the set of weight vectors {$\bar{x}_p$}.

|  | $\bar{v}_{A_p}^{tx}$ | $\bar{v}_{B_p}^{rx}$ | $\bar{v}_{B_p}^{tx}$ | $\bar{v}_{A_p}^{rx}$ |
|---|---|---|---|---|
| MF | $\bar{w}_{A_p}$ | $\bar{w}_{B_p}$ | $\bar{w}_{B_p}$ | $\bar{w}_{A_p}$ |
| ZF1 | ZF({$\bar{w}_{A_p}$}) | ZF({$H_p\bar{w}_{A_p}$}) | $\bar{w}_{B_p}$ | ZF({$\bar{w}_{A_p}$}) |
| ZF2 | $\bar{w}_{A_p}$ | ZF({$\bar{w}_{B_p}$}) | $\bar{w}_{B_p}$ | ZF({$\bar{w}_{A_p}$}) |

The expression of the post-processing SNR is given after ZF filtering in the DL for ZF1 and ZF2 at user p. Reception in DL can be treated in the same way. During the training phase, estimation of $H_p v_{A_q}$, $q \in [1 \ldots P]$ may be performed. The $q^{th}$ estimate is denoted as $\hat{v}_{B_q}$ and may be equal to $w_{B_q}^*$ for ZF2.

$$F_q = P_{V_{B_p}}^{\perp} \hat{v}_{B_q}$$

is the ZF receiver used to recover the data of user p, where $V_{B_p}$ is a N×(P−1) matrix with columns spanning the set {$\hat{v}_{B_q}$, q≠p}. The receive signal is expressed as:

$$y_{B_p}^d = H_p V_A + n_B^d \quad (28)$$

where $V_A = [v_{A_1} \ldots v_{A_p}]$ is the M×P matrix made out of the all transmit beamforming weights. The post-processed data is:

$$F_d^H y_{B_p}^d = F_d^H H_p V_A + F_d^H n_B^d \quad (29)$$

from which, the post-processing SNR may be expressed as:

$$SNR_p^{ZF1/2} = \frac{F_d^H H_p V_A V_A^H H_p^H F_d}{\sigma_n^2 F_d^H F_d}. \quad (30)$$

As for the single user case, the adaptive modulation and coding level may be decided at a given transmitter used on the reciprocity principle.

Decision direction modes may now be discussed with respect to some embodiments.

It is desired to improve estimation of weight vectors obtained by training by further averaging out the noise. The main value of this procedure is its extreme simplicity.

For a single user case, consider operations at receiver A (the same procedure is performed when B is the receiver). Index h designates the time index within the data block.

During data mode, the received signal at time n is:

$$y_A^d(n) = H^T \bar{w}_B x_B(n) + n_A^d(n) \quad (32)$$

H is time-invariant. $\bar{w}_B$ is the estimate of the beamforming weights at device B after the training and decision directed estimation performed at device B. $x_B(n)$ is the transmitted symbol from device B and $n_A^d(n)$ the received noise.

Denote $w_A(n-1)$ as the estimate of $(H^T \bar{w}_B)^*$ acquired at time n−1. A first estimate $w_A^{ts}$ is obtained after the training period at receiver A (see FIG. 5). $w_A$ is initialized by $w_A^{ts}$.

For data decoding, matched filter is performed as follows:

$$w_A(n-1)^T y_A^d(n) \quad (33)$$

$x_B(n)$ is then decoded and $y_A^d$ is divided by $x_B$.

A new estimate of $w_A$ is formed as:

$$w_A(n) = \alpha w_A(n-1) + (1-\alpha)((y_A^d(n)/x_B)^*, \quad (34)$$

where 0≤α≤1 depends on the training length and iteration number n. When the channel is time-variant, an adaptive estimation procedure can be performed: for example, α can be chosen as a forgetting factor.

To describe a multi-user case, the case of 2 users will be considered for clarity of presentation.

Consider first device A. During data mode, the received signal at time n is:

$$y_A^d(n) = H_1^T \bar{w}_{B_1} x_{B_1}(n) + H_2^T \bar{w}_{B_2} x_{B_2}(n) + n_A^d(n). \quad (35)$$

H is time-invariant. $\bar{w}_{B_i}$ is the estimate of the beamforming weights at device $B_i$ after the training and decision directed estimation performed at device $B_i$. $x_{B_i}(n)$ is the transmitted symbol from device $B_i$ and $n_A^d(n)$ is the received noise. Denote $w_{A_i}(n-1)$ as the estimate of $(H^T \bar{w}_{B_i})^*$ acquired at time n−1. A first estimate $w_{A_i}^{ts}$ may be obtained after the training period at receiver A (see FIG. 5). $w_{A_i}$ is initialized by $w_{A_i}^{ts}$.

After data decoding of $x_{B_1}(n)$ and $x_{B_2}(n)$, vector $w_{A_2}(n-1)x_{B_2}(n)$ is subtracted from $y_A^d(n)$:

$$y_A^d(n) - w_{A_1}(n-1)x_{B_1}(n) \approx H^T \bar{w}_{B_1} x_{B_1}(n) + n_A^d(n) \quad (36)$$

Then a new estimate of $w_{A_1}$ is formed as:

$$w_{A_1}(n+1) = \alpha_{A_1} w_{A_1}(n) + (1-\alpha_{A_1})((y_A^d(n) - w_{A_2}(n-1)x_{B_2}(n))/x_B)^* \quad (37)$$

$0 \leq \alpha_{A_1} \leq 1$. A similar procedure may be carried out for $w_{A_2}$.

In the downlink, the same procedure may be carried out. Device $B_1$ may rely on the estimation of $H_1 w_{A_2}$, which can be done using the available training and decoding of $x_{A_2}(n)$. As the algorithm converges, $H_1 w_{A_2} x_{A_2}(n)$ becomes small in general, so decoding $x_{A_2}(n)$ may become difficult. In such a case, the subtraction performed above may not be done and update of $w_{A_1}$ is done as:

$$w_{A_1}(n+1) = \alpha_{A_1} w_A(n) + (1-\alpha_{A_1})(y_d^A(n)/x_B)^* \quad (38)$$

PPB may now be described for time-spreading channels in accordance with some embodiments.

It may be desirable for pre- and post-processing based on eigenmodes to reduce the channel spread and then equalize the matricial channel.

Assume a causal channel from device A to device B, written as a polynomial:

$$H(z) = \sum_{i=0}^{l-1} H_i z^{-i}, \quad (39)$$

where $H_i$ are matrices N×M matrices and l is the length of the channel.

Describing first a training procedure to track the maximal eigenvectors of each $H_i$ and then the equalization. Assume that l=2 for ease of presentation.

The training procedure may be described as follows.

Operation 0.1 may include an initial transmission from device A to device B.

Device A may send a sequence of I vectors: the vector $\bar{w}_A^{(0)} s(1)$ preceded by I−1 vectors equal to 0 (no transmission). The received signal at device B can be written:

$$y_B^{(0)}(z) = H_0 \bar{w}_A^{(0)} s(1) + H_1 \bar{w}_A^{(0)} s(1) z^{-1} + N(z) \bar{w}_A^{(0)} s(1) \quad (40)$$

L such sequences are sent. Each sequence embeds one symbol from a training sequence of length L denoted as S such that the concatenation of received signals is:

$$Y_B^{(0)}(z) = H_0 \bar{w}_A^{(0)} s^T + H_1 \bar{w}_A^{(0)} s^T z^{-1} + N(z) \bar{w}_A^{(0)} s^T \quad (41)$$

The signal at delay 0 and delay 1 may be multiplied by $s^T$ to obtain an estimate of $H_0 \bar{w}_A^{(0)}$ and $H_1 \bar{w}_A^{(0)}$, denoted as: $w_{B_0}^{(0)*}$ and $w_{B_1}^{(0)*}$.

Operation 0.2 may include an initial transmission from device B to device A.

Having I orthogonal training sequences denoted as $s_i$ to track the eigenvectors of each channel coefficient individually, device B sends a vectorial sequence of I vectors: the vector $\overline{w}_{B_0}^{(0)}s_0(n)+\overline{w}_{B_1}^{(0)}s_1(n)$ preceded by I−1 vectors equal to 0 (no transmission).

Device B may transmit L such sequences, each containing a different training symbol. The corresponding received signal at device A can be written:

$$Y_A^{(1)}(z)=(H_0^T\overline{w}_B^{(0)}s_0^T+H_0^T\overline{w}_{B_1}^{(0)}s_1^T)+ \\ (H_1^T\overline{w}_B^{(0)}s_0^T+H_1^T\overline{w}_{B_1}^{(0)}s_1^T)z^{-1}+ \\ N(z)(\overline{w}_{B_0}^{(0)}s_0^T+\overline{w}_{B_1}^{(0)}s_1^T) \quad (42)$$

The signal at delay 0 and delay 1 may be multiplied by $s_0^T$ and $s_1^T$ to obtain the estimates: $w_{A_0}^{(1)*}$ and $w_{A_1}^{(1)*}$ of $H_0^T\overline{w}_{B_0}^{(0)}$ and $H_1^T\overline{w}_{B_1}^{(0)}$.

Operation k+1 may include transmission from device A to device B.

Assume that device A has estimated $w_{A_0}^{(k)}$ and $w_{A_1}^{(k)}$. Device A may send a vectorial sequence of I vectors: the vector $\overline{w}_{A_0}^{(k)}s_0(n)+\overline{w}_{A_1}^{(k)}s_1(n)$ preceded by I−1 vectors equal to 0 (no transmission). Device A may transmit L such sequences, each containing a different training symbol. The corresponding received signal at device B can be written:

$$Y_B^{(k)}(z)=(H_0\overline{w}_{A_0}^{(k)}s_0^T+H_0\overline{w}_{A_1}^{(k)}s_1^T)+(H_1\overline{w}_{A_0}^{(k)}s_0^T+ \\ H_1\overline{w}_{A_1}^{(k)}s_1^T)z^{-1}+N(z)(\overline{w}_{A_0}^{(k)}s_0^T+\overline{w}_{A_1}^{(0)}s_1^T) \quad (43)$$

The signal at delay 0 and delay 1 may be multiplied by $s_0^T$ and $s_1^T$ to obtain the estimates: $w_{B_0}^{(k)*}$ and $w_{B_1}^{(k)*}$ of $H_0^T\overline{w}_{A_0}^{(k)}$ and $H_1^T\overline{w}_{A_1}^{(k)}$.

At convergence in the data mode, the beamforming vectors may be noted as $w_{A_i}$, $w_{B_i}$, i=0, . . . 2 and estimates pf the maximal eigenvalues of $H_i$ at transmitter or receiver may be denoted as $\lambda_i$.

One pre- and post-processing is as follows:

$$W_A=\lambda_0^*\overline{w}_{A_0}+\lambda_1^*\overline{w}_{A_1}z \text{ and } W_B=\overline{w}_{B_0}^T+\overline{w}_{B_1}^T \quad (44)$$

$$W_B(z)H(z)W_A(z)=\lambda_0^*\overline{w}_{B_0}^T H_0\overline{w}_{A_0}+\lambda_1^*\overline{w}_{B_1}^T H_1\overline{w}_{A_1}+ \\ \lambda_0^*\overline{w}_{B_1}^T H_0\overline{w}_{A_0}+\lambda_1^*\overline{w}_{B_0}^T H_1\overline{w}_{A_1} \quad (45)$$

$$+(\overline{w}_{B_0}^T+\overline{w}_{B_1}^T)\lambda_0^*H_1\overline{w}_{A_0}z^{-1} \quad (46)$$

$$+(\overline{w}_{B_0}^T+\overline{w}_{B_1}^T)\lambda_1^*H_0\overline{w}_{A_1}z \quad (47)$$

Note that $\lambda_0^*\overline{w}_{B_0}^T H_0\overline{w}_{A_0}=\lambda_0^2$, $\lambda_1^*\overline{w}_{B_1}^T H_1\overline{w}_{A_1}=\lambda_1^2$, $\overline{w}_{B_i}^T H_0 \overline{w}_{A_j}=\lambda_0^2$, i≠j. $\overline{w}_{B_i}^T H_1\overline{w}_{A_j}=\lambda_1^2$, i≠j.

Therefore:

$$W_B(z)H(z)W_A(z): \lambda_0^2+\lambda_1^2 \quad (48)$$

The inter-symbol interference is suppressed and the resulting channel preserves the overall energy.

In quasi-blind PPB for a singular user case, it may be desirable for an implementation of PPB where training is used only during the first round-trip.

One initial transmission with training may be necessary to raise the ambiguity due to blind transmission (here phase ambiguity). Another transmission may be needed to improve data decoding performance.

The estimation of the weight vectors may be improved using decision directed mode as described previously.

The numerical results may now be evaluated with respect to various embodiments.

Assuming a rich scattering environment, each channel coefficient may be modelled as a centered, unit variance Gaussian random variable (circularly symmetric complex) and uncorrelated across antennas. The average SNR per link is defined as $\rho=P_T E|h|^2/\sigma_n^2$, recalling that $P_T$ the transmit power is set to 1. Considering a low to mid-range SNR $\rho$ of −5 dB, 0 dB, 5 dB and 10 dB and, unless stated otherwise, massive arrays at both ends with M=N=200 antennas. The metrics shown are the results of an average over Monte-Carlo runs of both the channel and the noise. The length of the training sequence is set equal to 4.

Single user performance may be considered first.

Figure 7:
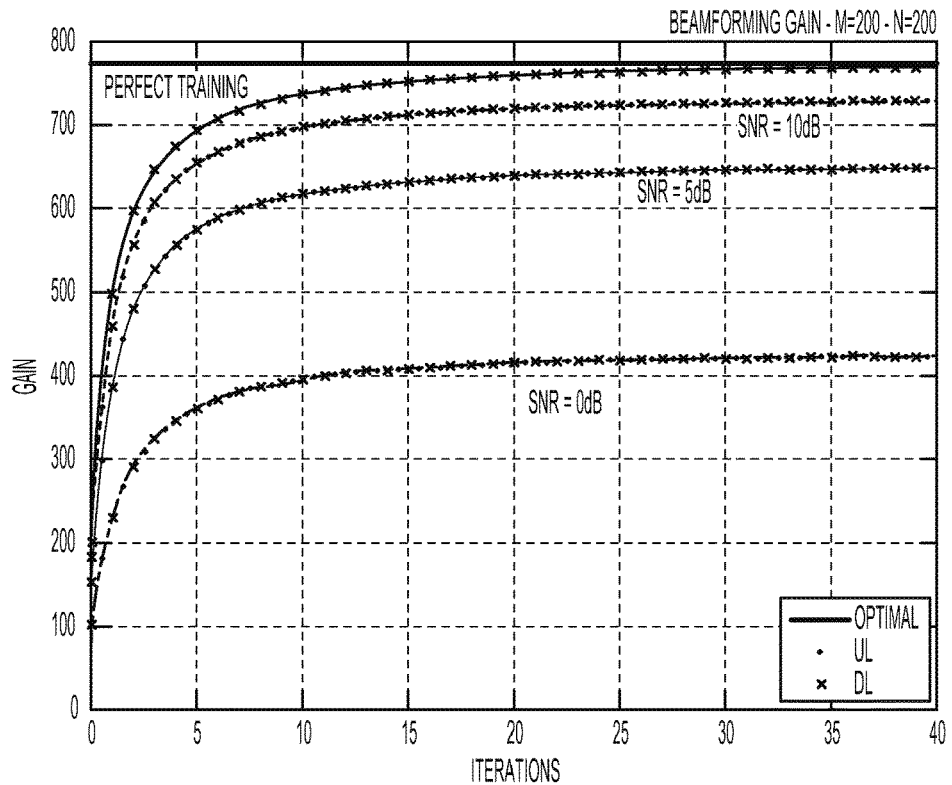
FIG. 7 is a chart that illustrates beamforming as a function of iterations in accordance with some embodiments.

In FIG. 7, the metric shown is the beamforming gain versus the iteration number in accordance with some embodiments. FIG. 7 plots the performance in DL$|w_B^{(k)H}Hw_A^{(k)}|^2$ and in UL$|w_B^{(k-1)H}Hw_A^{(k)}|^2$ (iteration integer values) for the following cases: (a) the maximal beamforming gain equal to $\lambda_{max}^2$ (labelled as "optimal") and attained when the channel is known at both transmitter and receiver; (b) the noise-free case; and (c) the noisy case.

The process converges, in an average sense, even in the noisy case. Convergence is reached after a few tens of iterations. For the selected parameters, ten iterations may be sufficient for reasonable performance. Note that the maximal beamforming gain $\lambda_{max}^2$ approaches 4M. In those simulations, the channel is Gaussian and uncorrelated at both transmitter and receiver. For a correlated channel, the beamforming gain is larger (as the energy is concentrated in the largest singular values) and we expect the convergence speed to be faster.

The examples show the behavior of PPB when the channel is time-varying. The channel is block fading: it remains constant during one time slot (including one training period and data transmission) and changes from time slot to time slot according to Clarke's model shown in the related art. There is no additive noise (the BF weights are perfectly estimated at each iteration), so that only the effect of the channel time variations is accounted for. Each channel coefficient from antenna i to antenna j at time n is written as:

$$h_{ij}(n) = \frac{1}{\sqrt{N_s}}\sum_{q=1}^{N_s} e^{j2\pi f_d n t_s \cos\alpha_q + \phi_q}, \quad (49)$$

where $N_s$ is the number of scatterers and is equal to 20, $f_d$ is the maximum Doppler shift, $\alpha_q$ and $\phi_q$ is the angle of arrival and initial phase, respectively, of the wave from the q'th scatterer. Both $\alpha_q$ and $\phi_q$ are i.i.d. in the interval $[-\pi,\pi)$ and $$f_d = \frac{v}{c}f_c,$$

where v is the speed of the UE, C is the speed of light and $f_c$ is the carrier frequency. $f_c$ is set to 60 GHz and the inter-training time is $t_s$=0.01 ms.

Figure 8:
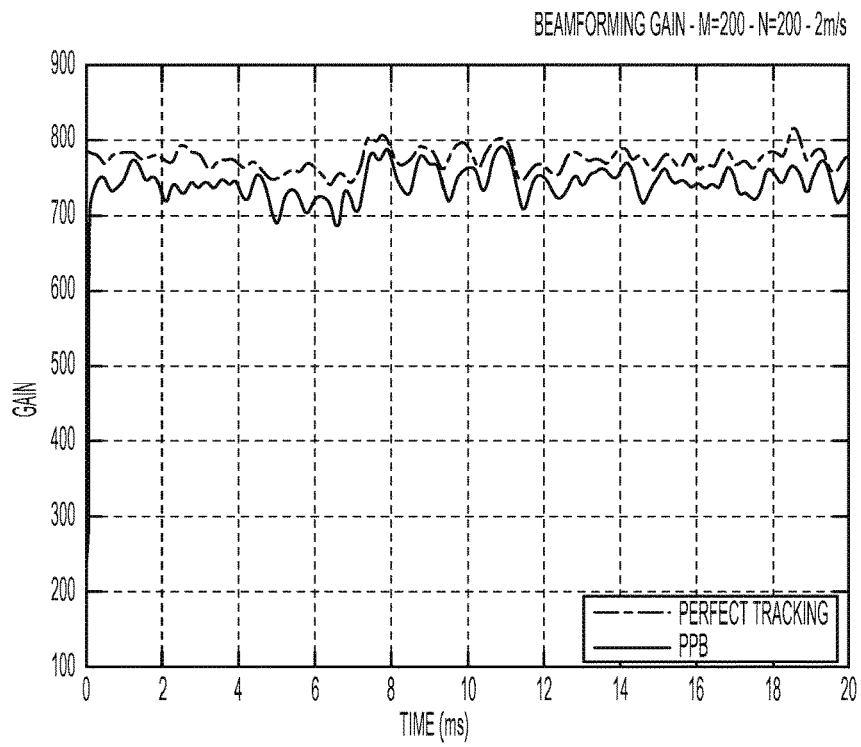
FIG. 8 is a chart that illustrates beamforming gain as a function of time for a speed of 2 meters per second (m/s) for one given channel realization in accordance with some embodiments.

In FIG. 8, the beamforming gain is plotted as a function of time for a speed of 1 m/s for one given channel realization over a time span of 1 s in accordance with some embodiments. To evaluate the tracking ability of PPB, we also plot the instantaneous value of $\lambda_{max}^2$. A very good tracking from PPB is observed.

Figure 9:
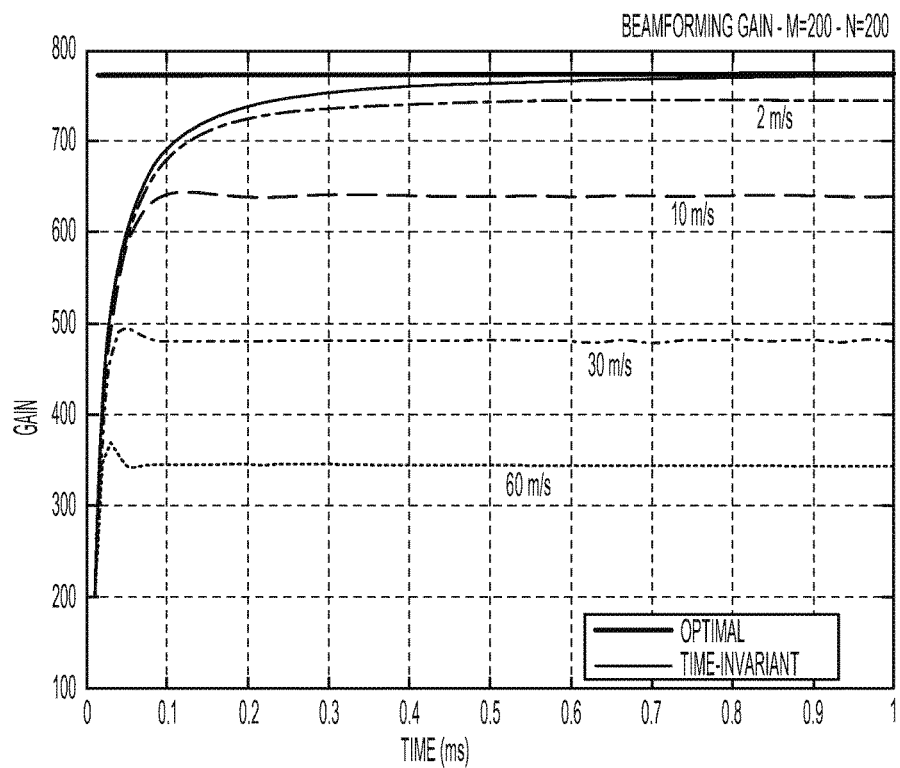
FIG. 9 is a chart that illustrates beamforming gain as a function of time for different speeds averaged over many channel realizations in accordance with some embodiments.

To further analyze the mechanism behind the tracking, FIG. 9 illustrates beamforming gain averaged over many channel realizations as the speed grows in accordance with some embodiments. The process converges on average but there is an increasing loss as the speed increases. Furthermore, the steady state is reached sooner as the speed grows. In a time invariant channel, PPB builds on a memory of past samples containing information about the present state of the channel. When the channel is time-variant, the amount of information available gets reduced and is not sufficient to reach the steady state of a time-invariant channel.

Multi-user performance will now be evaluated.

Figure 10:
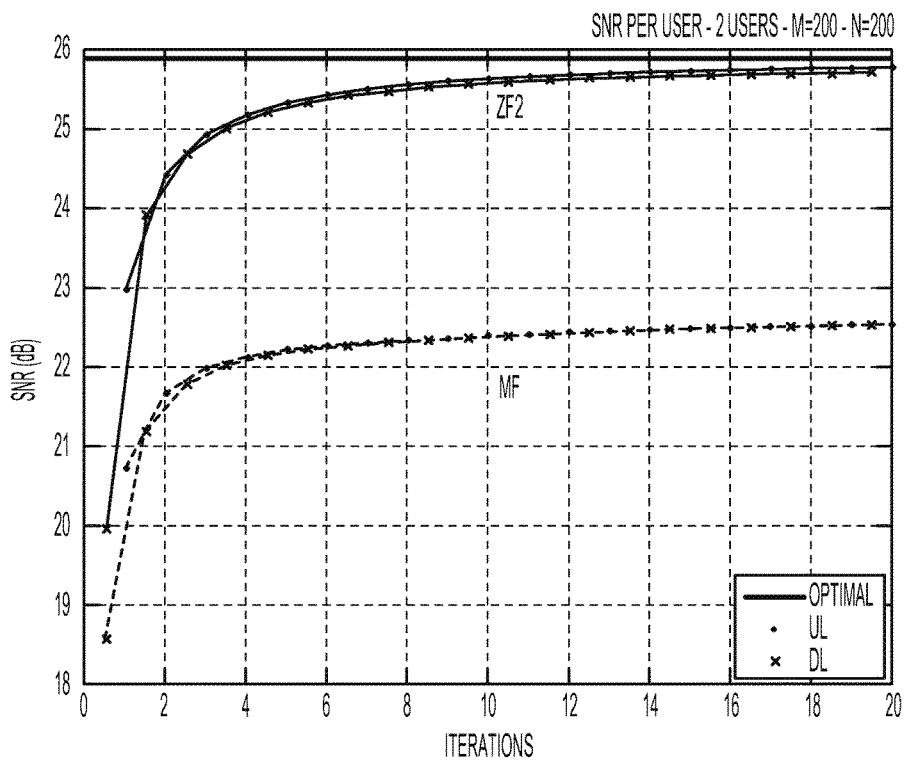
FIG. 10 is a chart that illustrates a comparison of post-processing signal-to-noise ratio (SNR) after matched filtering and a zero-forcing filtering for two users in accordance with some embodiments.

In the whole section, we restrict the number of users to P=2. In FIG. 10, the multi-user MF solution is compared, as described in in previous parts, with ZF2, for an SNR ρ of 0 dB in accordance with some embodiments. It is assumed that weight estimation is perfect, so only the difference in performance between MF and ZF2 is measured. The post-processing SNR is shown where the residual inter-user interference in MF is treated as noise. As predicted earlier, a degradation of MF compared to ZF2 is observed. Next, there is only focus on ZF1 and ZF2.

Figure 11A:
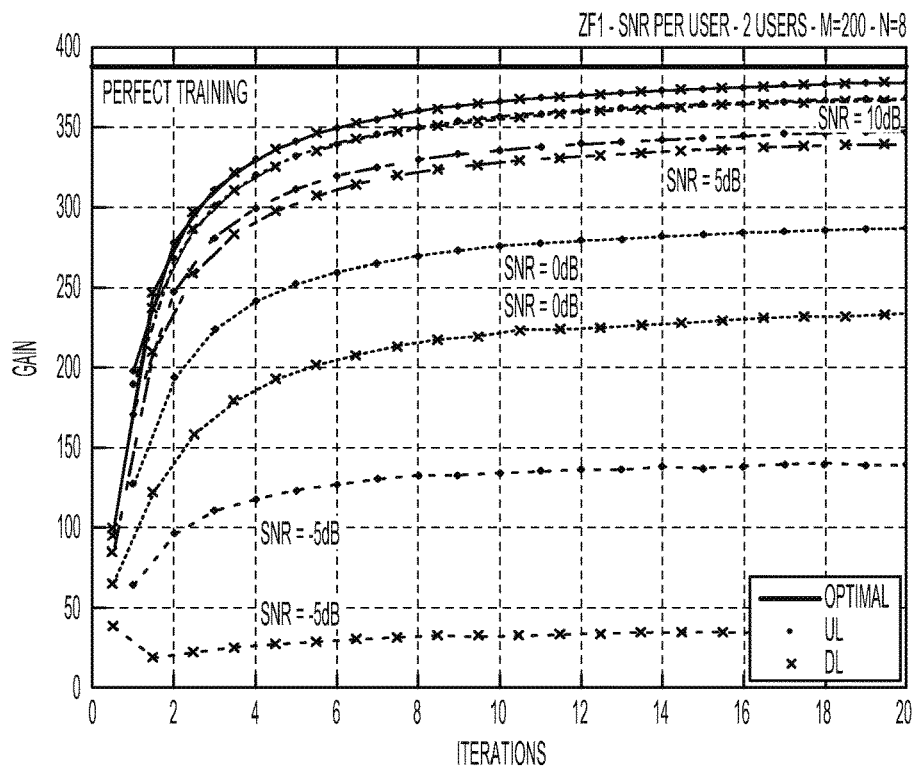
FIG. 11 is a chart that illustrates a comparison of a first zero-forcing filtering and a second zero-forcing filtering for two users in accordance with some embodiments.
Figure 11B:
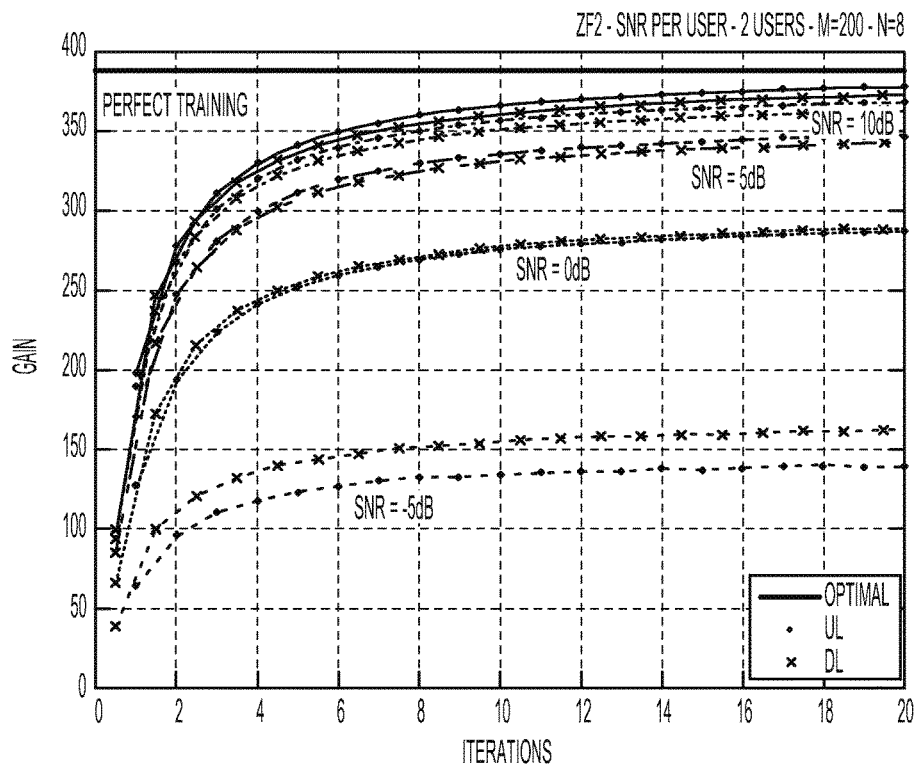
Figure 12A:
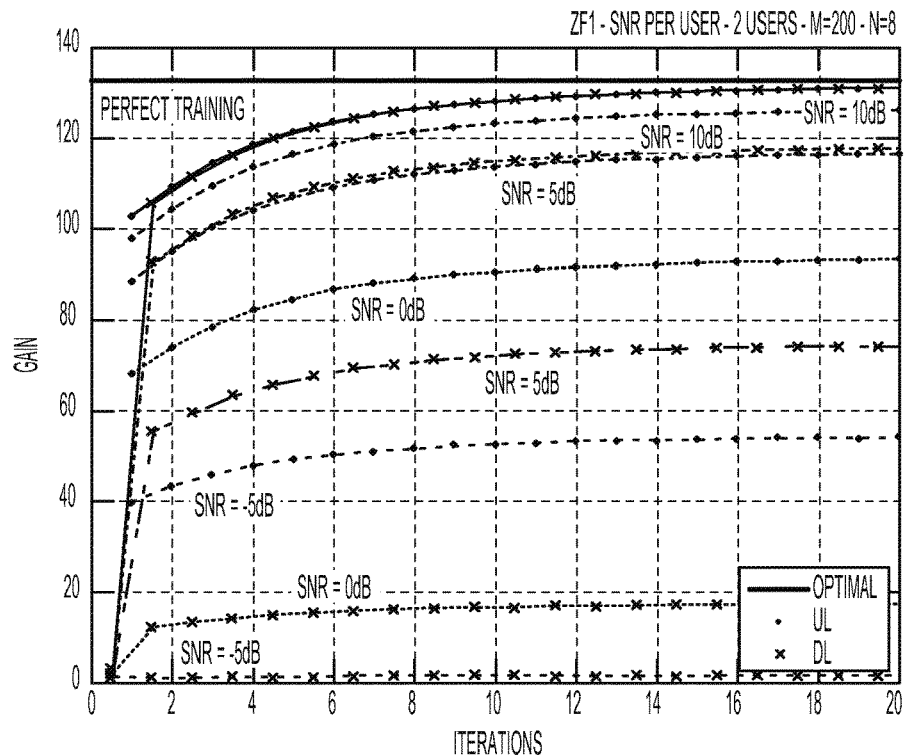
FIG. 12 is a chart that illustrates a comparison of a first zero-forcing filtering and a second zero-forcing filtering for two users in accordance with some additional embodiments.
Figure 12B:
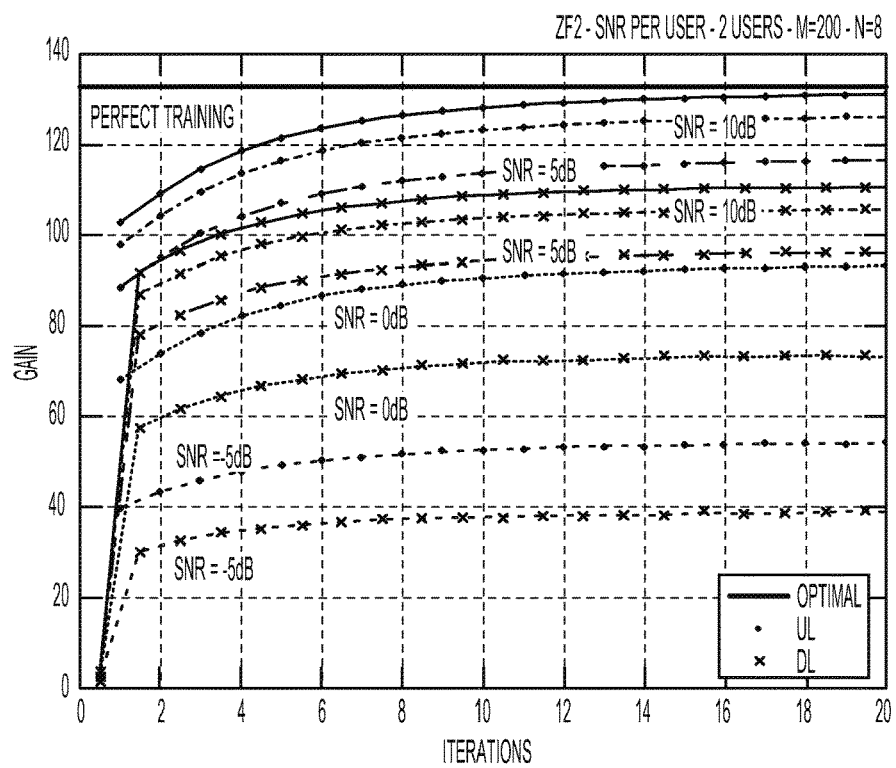

ZF1 and ZF2 is compared for different values of SNR ρ, resulting in different levels of estimation errors on the beamforming weights. The product $SNR_p^{ZF1/2}\sigma_n^2$ is shown in order to have a performance metric independent of the noise level. In FIG. 11, the performance when both M and N are large is displayed in accordance with some embodiments. When comparing ZF1 and ZF2 with no estimation error or at ρ=10 dB, performance at the users is slightly worse for ZF2. At smaller SNR, however, a strong degradation of the performance is seen at the user side for ZF1 while ZF2 appears more robust to the presence of noise. The reason is that the pre-processing at the base station involves a ZF filter for ZF1 which is more sensitive to estimation errors than MF performed in ZF2.

In FIG. 11, the performance when M is large but N is small is displayed in accordance with some embodiments. As predicted, at high SNR, performance of ZF1 is better than ZF2 at the user side. However, at lower SNR, again, ZF2 remains more robust to noise.

Figure 13A:
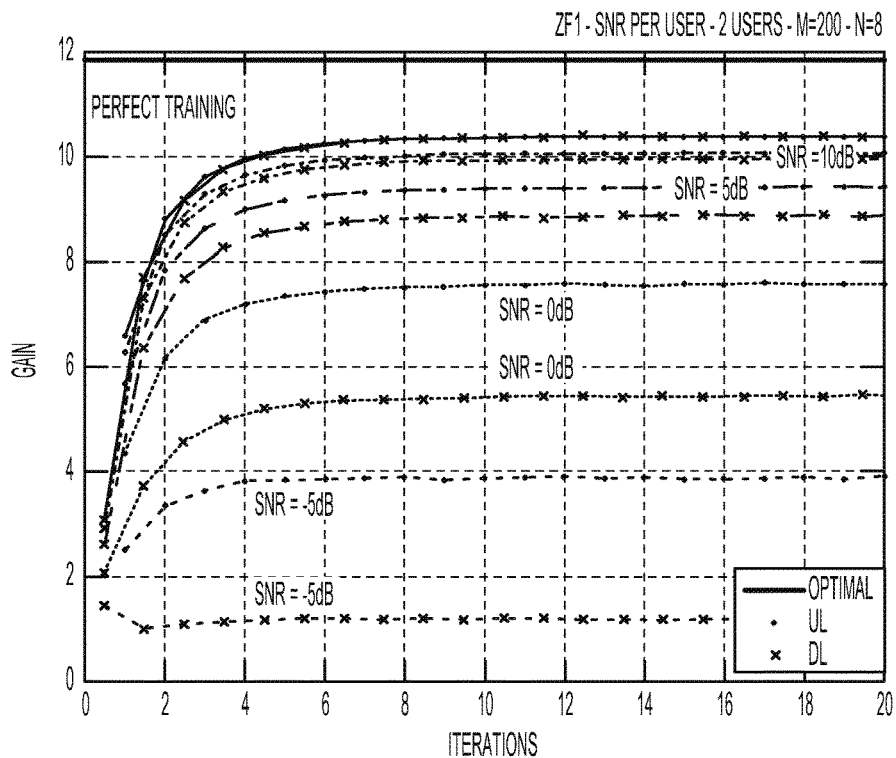
FIG. 13 is a chart that illustrates a comparison of a first zero-forcing filtering and a second zero-forcing filtering for two users in accordance with some additional embodiments.
Figure 13B:
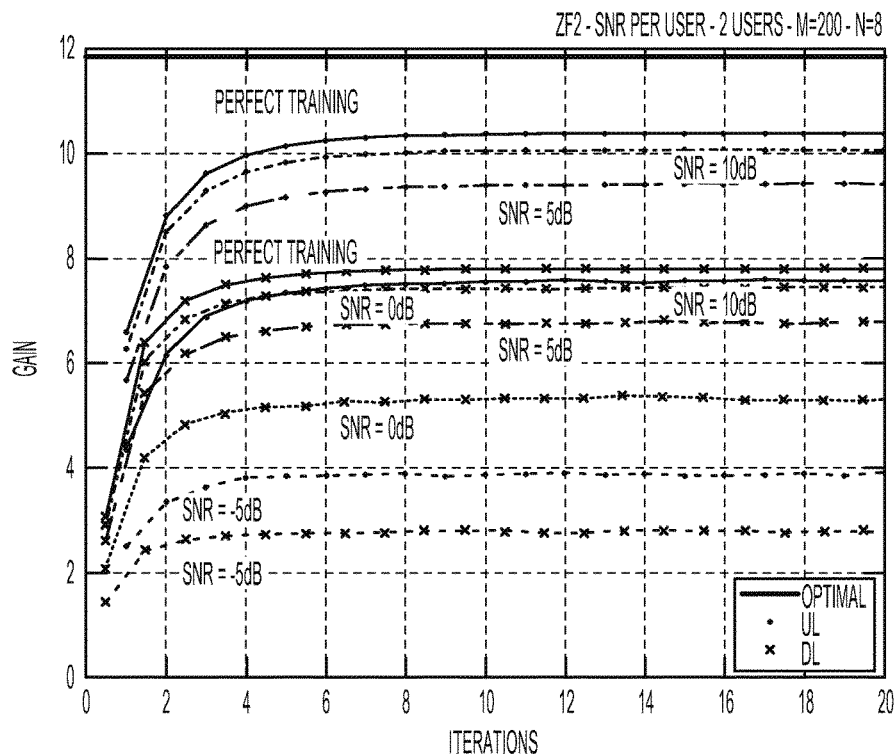

At last, the performance for a small number of antennas at both ends is shown in FIG. 13 in accordance with some embodiments. Although not optimal, the transceiver shows an acceptable gain and could be used in practice. A large gap for ZF2 between UL and DL perfect training performance is observed.

As a conclusion, ZF1 appears as the best transceiver for the main case where both M and N are large. It is also the most robust transceiver to estimation errors. When M is large but N is small, ZF2 performs better when the estimation error level is low.

In communications involving massive antenna arrays at both ends, estimating all the channel coefficients is a very inefficient procedure, especially when a single stream of data per user is sent. A superior option is to estimate the weight vectors carrying the data as described herein. The description shows the principles of ping-pong beamforming as an efficient method to estimate the maximal eigenvectors of a MIMO channel in a single user and multi-user set-up, assuming channel reciprocity. PPB reveals a large benefit at mm-wave frequencies when devices are equipped with a very large number of antennas. The training requirements are significantly reduced compared to direct channel estimation and, due to its adaptive nature, PPB is fit to follow the variations of the wireless channel. Moreover, PPB can alleviate the cost and power consumption by minimizing the number of analog front-ends. PPB may be applied to a multi-user setting with desired transceivers being built from the maximal eigenvectors of the channel, when both ends of the communication involve a very large number of antennas.

Thus, as shown, embodiments of the present disclosure relate to an efficient training procedure to estimate the maximal eigenvectors of a MIMO channel in time-division duplex mode. Assuming channel reciprocity, we describe an iterative procedure relying on ping-pong transmissions between two antenna arrays, where, at each iteration, a device simply returns the conjugate of the signal that it was just served. Ping-Pong Beamforming (PPB) converges to the optimal beamforming weights at each communication end, for example, the maximal (left and right) eigenvectors of the channel matrix. PPB may only need a few tens of iterations and may be robust to additive noise at the receiver end. PPB may significantly alleviate the training requirements when both arrays are equipped with a very large number of antennas and, therefore, has a distinct interest in millimeter-wave communications where such massive arrays are expected. PPB may be extended to a multi-user MIMO communication setting where a single stream is sent per user. Training procedures are devised where the eigenvectors of each user's channel is tracked. Optimal transceivers can be built from the maximal eigenvectors of the channel, when both ends of the communication link involve massive antenna arrays.

Figure 14:
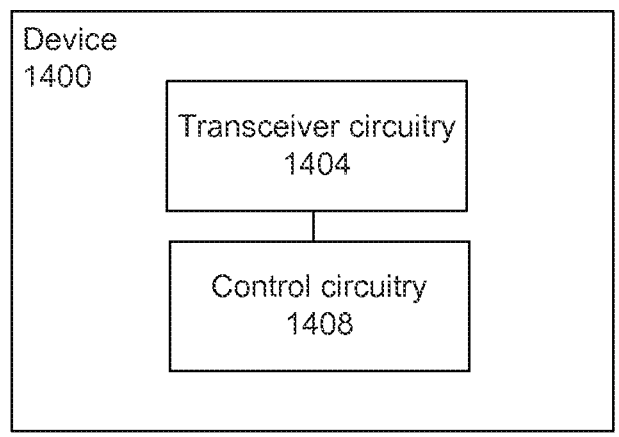
FIG. 14 is a device in accordance with some embodiments.

FIG. 14 illustrates a device 1400 in accordance with some embodiments. The device 1400 may be the device A or device B discussed above.

The device 1400 may include transceiver circuitry 1404 coupled with control circuitry 1408.

The transceiver circuitry 1404 may be configured to communicate with other network entities over various interfaces using appropriate networking communication protocols. For example, in some embodiments the transceiver circuitry 1404 may be configured to communicate over a radio interface with, for example, mm-wave signals using large antenna arrays. The transceiver circuitry 1404 may include components similar to those described above with respect to FIGS. 1, 3, and 4.

The transceiver circuitry 1404 may provide information/signals received over the radio interface from another device and provide the information/signals to the control circuitry 1408 for further, higher-layer processing. The transceiver circuitry 1404 may also receive information from the control circuitry 1408 that is to be transmitted over the radio interfaces and transmit the signals.

The control circuitry 1408 may drive the PPB process by being configured to determine the appropriate weight vectors and controlling the transceiver circuitry in the transmission and reception of training signals (and data) using the determined weight vectors. For example, with reference to FIG. 4, the control circuitry 1408 may control the analog components of transceiver circuitry by, for example, providing analog weights acquired during training to the variable phase shifters 412 or variable gain amplifiers 416 (or by providing amplifier weights to the combiners 120 and weight vectors to the beamformers 120 of FIG. 1). For another example, the control circuitry 1408 may control the transmission of signals by providing appropriate weight vectors to the beamforming elements 108 shown in FIG. 1.

Figure 15:
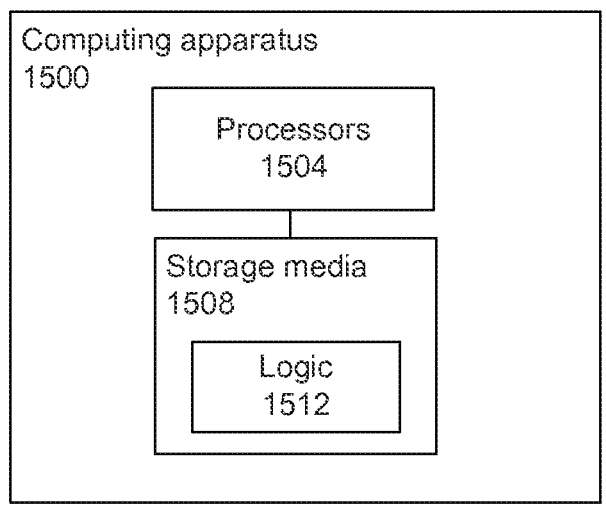
FIG. 15 is a computing apparatus in accordance with some embodiments.

Embodiments described herein may be implemented into a system using any suitably configured hardware and/or software. FIG. 15 illustrates, for one embodiment, example components of a computing apparatus 1500, which may comprise, or be part of, device A or B as described above.

The computing apparatus 1500 may include one or more processors 1504 coupled with one or more storage media 1508. The processors 1504 may include one or more single-core or multi-core processors. The processors may include any combination of general-purpose processors and dedicated processors including, for example, digital signal processors (DSPs), central processing units (CPUs), microprocessors, memory controllers (integrated or discrete), etc.

The storage media 1508 may be used to load and store data or instructions (collectively "logic 1512") for operations performed by the processors 1504. The storage media 1508 may include any combination of suitable volatile memory and non-volatile memory. The storage media 1508 may include any combination of various levels of memory/storage including, but not limited to, read-only memory (ROM) having embedded software instructions (e.g., firmware), random access memory (e.g., dynamic random access memory (DRAM)), cache, buffers, etc. The storage media 1508 may be shared among the various processors or dedicated to particular processors.

In some embodiments, one or more of the processors 1504 may be combined with one or more storage media 1508 and, possibly other circuitry in a single chip, a single chipset, or disposed on a same circuit board in some embodiments.

The computing apparatus 1500 may perform one or more of the operations described above with respect to the control circuitry 1408 or with respect to the transceiver circuitry 1404.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

Some non-limiting examples are provided below.

Example 1 includes one or more computer-readable media having instructions that, when executed, cause a first device to: send a first training signal using a first weight vector to a second device; receive, from the second device, a second training signal sent using a second weight vector; estimate, based on the second training signal, a first indexed signal that is a product of the second weight vector and a second channel; determine a third weight vector based on a complex conjugate of the estimate; and normalize the third weight vector.

Example 2 includes the one or more computer-readable media of example 1, wherein said send, receive, estimate, determine, and normalize comprise a first iteration of a ping-pong beamforming process and the instructions, when executed, cause the first device to: perform additional iterations of the ping-pong beamforming process until a convergence criterion is determined to be satisfied.

Example 3 includes the one or more computer-readable media of example 2, wherein the convergence criterion is based on a comparison of a norm of a fourth weight vector to a predetermined threshold.

Example 4 includes the one or more computer-readable media of example 2, wherein the first weight vector is a randomly chosen value or a value determined by a second iteration of the ping-pong beamforming process that precedes the first iteration.

Example 5 includes the one or more computer-readable media of any one of examples 1-4, wherein the instructions, when executed, further cause the device to: take the complex conjugate of the estimate.

Example 6 includes the one or more computer-readable media of any one of examples 1-5, wherein said send, receive, estimate, determine, and normalize comprise a first iteration of a ping-pong beamforming process and the instructions, when executed, cause the first device to: perform the ping-pong beamforming process using a first transmission protocol to exchange messages with the second device, the first transmission protocol comprises a plurality of time slots with individual time slots being dedicated to one transmission direction and having a training period followed by a data period.

Example 7 includes the one or more computer-readable media of example 6, wherein the instructions, when executed, further cause the device to: perform an initialization procedure to acquire the first weight vector in a first time slot; and send the first training signal in a second time slot that follows the first time slot.

Example 8 includes the one or more computer-readable media of any one of examples 1-7, wherein the instructions, when executed, further cause the first device to: receive a training signal matrix that comprises a first weight vector portion and a first noise portion; estimate a normalized matched filter based on the matrix; and perform noise suppression based on the estimated normalized matched filter.

Example 9 includes the one or more computer-readable media of any one of examples 1-8, wherein the first device is a base station, the second device is a user device, and the instructions, when executed, further cause the base station to: perform a ping-pong beamforming process, which includes said send, receive, estimate, determine, and normalize, in a multi-user multiple-input, multiple-output (MIMO) process.

Example 10 includes an apparatus comprising: transceiver circuitry; and control circuitry coupled with the transceiver circuitry, the control circuitry to receive, from a device, a first training signal transmitted using a first weight vector; estimate, based on the first training signal, a first indexed signal that is a product of the first weight vector and a first channel; determine a second weight vector based on a complex conjugate of the estimate; and normalize the second weight vector.

Example 11 includes the apparatus of example 10, wherein the apparatus is a base station and the control circuitry is to transmit, via the transceiver circuitry to the device, a second training signal using a second weight vector, wherein the second training signal is to be transmitted to the device before receipt of the first training signal.

Example 12 includes the apparatus of example 10, wherein said receive, estimate, determine, and normalize comprise a first iteration of a ping-pong beamforming process and the control circuitry is further to: perform additional iterations of the ping-pong beamforming process until a convergence criterion is determined to be satisfied.

Example 13 includes the apparatus of example 12, wherein the convergence criterion is based on a comparison of a norm of a third weight vector to a predetermined threshold.

Example 14 includes the apparatus of any one of examples 10-13, wherein the control circuitry is to: take the complex conjugate of the estimate.

Example 15 includes the apparatus of any one of examples 10-14, wherein said send, receive, estimate, determine, and normalize comprise a first iteration of a ping-pong beamforming process and the control circuitry is to: perform the ping-pong beamforming process using a first transmission protocol to exchange messages with the device, the first transmission protocol comprises a plurality of time slots with individual time slots being dedicated to one transmission direction and having a training period followed by a data period.

Example 16 include the apparatus of example 15, the control circuitry is to: perform an initialization procedure to acquire the first weight vector in a first time slot; and send the first training signal in a second time slot that follows the first time slot.

Example 17 includes the apparatus of any one of examples 10-16, wherein the control circuitry is to: transmit, via the transceiver circuitry, a data symbol using the normalized second weight vector; receive, via the transceiver circuitry, a data signal from the device; and apply a normalized third weight vector to the data signal to recover the data symbol.

Example 18 includes the apparatus of any one of examples 10-17, wherein the transceiver circuitry is to perform matched filtering.

Example 19 includes the apparatus of any one of examples 10-17, wherein the transceiver circuitry is to perform zero-forcing filtering based on the first and second weight vectors.

Example 20 includes the apparatus of example 19, wherein the transceiver circuitry is to perform the zero-forcing filtering at a transmitter.

Example 21 includes the apparatus of example 19, wherein the transceiver circuitry is to perform the zero-forcing filtering at a receiver.

Example 22 includes the apparatus of any one of examples 10-21, wherein the transceiver circuitry comprises a plurality of antennas and is to provide millimeter wave communication.

Example 23 includes a method of operating a first device comprising: sending a first training signal using a first weight vector to a second device; receiving, from the second device, a second training signal sent using a second weight vector; estimating, based on the second training signal, a first indexed signal that is a product of the second weight vector and a second channel; determining a third weight vector based on a complex conjugate of the estimate; and normalizing the third weight vector.

Example 24 includes the method of example 23, wherein said sending, receiving, estimating, determining, and normalizing comprise a first iteration of a ping-pong beamforming process and the method further comprises: performing additional iterations of the ping-pong beamforming process until a convergence criterion is determined to be satisfied.

Example 25 includes the method of example 24, wherein the convergence criterion is based on a comparison of a norm of a fourth weight vector to a predetermined threshold.

Example 26 includes the method of example 24, wherein the first weight vector is a randomly chosen value or a value determined by a second iteration of the ping-pong beamforming process that precedes the first iteration.

Example 27 includes the method of example 23, further comprising: taking a complex conjugate of the estimate.

Example 28 includes the method of example 23, wherein said sending, receiving, estimating, determining, and normalizing comprise a first iteration of a ping-pong beamforming process and the method further comprises: performing the ping-pong beamforming process using a first transmission protocol to exchange messages with the second device, the first transmission protocol comprises a plurality of time slots with individual time slots being dedicated to one transmission direction and having a training period followed by a data period.

Example 29 includes the method of example 28, wherein the instructions further comprise: performing an initialization procedure to acquire the first weight vector in a first time slot; and sending the first training signal in a second time slot that follows the first time slot.

Example 30 includes the method of example 23, further comprising: receiving a training signal matrix that comprises a first weight vector portion and a first noise portion; estimating a normalized matched filter based on the matrix; and performing noise suppression based on the estimated normalized matched filter.

Example 31 includes the method of any one of examples 23-30, wherein the first device is a base station, the second device is a user device, and the method further comprises: performing a ping-pong beamforming process, which includes said sending, receiving, estimating, determining, and normalizing, in a multi-user multiple-input, multiple-output (MIMO) process.

Example 32 includes a method of operating an apparatus comprising: receiving, from a device, a first training signal transmitted using a first weight vector; estimating, based on the first training signal, a first indexed signal that is a product of the first weight vector and a first channel; determining a second weight vector based on a complex conjugate of the estimate; and normalizing the second weight vector.

Example 33 includes the method of example 32, wherein the apparatus is a base station and the method further comprises transmitting a second training signal using a second weight vector, wherein the second training signal is to be transmitted to the device before receipt of the first training signal.

Example 34 includes the method of example 32, wherein said receiving, estimating, determining, and normalizing comprise a first iteration of a ping-pong beamforming process and the method further comprises: performing additional iterations of the ping-pong beamforming process until a convergence criterion is determined to be satisfied.

Example 35 includes the method of example 34, wherein the convergence criterion is based on a comparison of a norm of a third weight vector to a predetermined threshold.

Example 36 includes the method of any one of examples 32-35, further comprising: taking the complex conjugate of the estimate.

Example 37 includes the method of any one of examples 32-36, wherein said receiving, estimating, determining, and normalizing comprise a first iteration of a ping-pong beamforming process and the method further comprises: performing the ping-pong beamforming process using a first transmission protocol to exchange messages with the device, the first transmission protocol comprises a plurality of time slots with individual time slots being dedicated to one transmission direction and having a training period followed by a data period.

Example 38 includes the method of example 37, further comprising: performing an initialization procedure to acquire the first weight vector in a first time slot; and sending the first training signal in a second time slot that follows the first time slot.

Example 39 includes the method of any one of examples 32-38, further comprising: transmitting a data symbol using the normalized second weight vector; receiving a data signal from the device; and applying a normalized third weight vector to the data signal to recover the data symbol.

Example 40 includes an apparatus comprising means to perform the method of any one of examples 23-39.

The invention claimed is:

1. One or more non-transitory, computer-readable media having one or more instructions, the one or more instructions comprising instructions that, when executed, cause a first device to:

perform a ping-pong beamforming process, wherein the instructions that, when executed, cause the first device to perform the ping-pong beamforming process comprise instructions that, when executed, cause the first device to:

send a first training signal using a first weight vector to a second device;

receive, from the second device, a second training signal sent using a second weight vector;

estimate, based on the second training signal, an indexed signal, wherein an estimate of the indexed signal comprises a product of the second weight vector and a channel;

determine a third weight vector based on a complex conjugate of the estimate of the indexed signal; and normalize the third weight vector; and perform a first iteration of the ping-pong beamforming process using a transmission protocol to exchange one or more messages with the second device, the transmission protocol comprising a plurality of time slots, and an individual time slot selected from the plurality of time slots dedicated to one transmission direction and comprising a training period followed by a data period, wherein the first iteration of the ping-pong beamforming process comprises the send, the receive, the estimate, the determine, and the normalize.

2. The one or more non-transitory, computer-readable media of claim 1, wherein the instructions further comprise additional instructions that, when executed, further cause the first device to:

perform one or more iterations of the ping-pong beamforming process until a convergence criterion is satisfied.

3. The one or more non-transitory, computer-readable media of claim 2, wherein the convergence criterion is based on a comparison of a norm of a fourth weight vector to a predetermined threshold.

4. The one or more non-transitory, computer-readable media of claim 2, wherein the first weight vector for the first iteration of the ping-pong beamforming process is a randomly chosen value or a value determined by a second iteration of the ping-pong beamforming process that precedes the first iteration.

5. The one or more non-transitory, computer-readable media of claim 1, wherein the instructions further comprise additional instructions that, when executed, further cause the first device to:

determine the complex conjugate of the estimate of the indexed signal.

6. The one or more non-transitory, computer-readable media of claim 1, wherein the instructions further comprise additional instructions that, when executed, further cause the first device to:

perform an initialization procedure to acquire the first weight vector in a first time slot; and send the first training signal in a second time slot that follows the first time slot.

7. The one or more non-transitory, computer-readable media of claim 1, wherein the instructions further comprise additional instructions that, when executed, further cause the first device to:

receive a training signal matrix that comprises a first weight vector portion and a first noise portion;

estimate a normalized matched filter, wherein an estimate of the normalized matched filter is based on the training signal matrix; and perform noise suppression based on the estimate of the normalized matched filter.

8. The one or more non-transitory, computer-readable media of claim 1, wherein the first device is a base station, wherein the second device is a user device, and wherein the instructions further comprise additional instructions that, when executed, further cause the base station to:

perform the ping-pong beamforming process in a multi-user multiple-input, multiple-output (MIMO) process.

9. An apparatus, comprising:

transceiver circuitry; and control circuitry coupled with the transceiver circuitry, the control circuitry configured to perform a ping-pong beamforming process, wherein, to perform the ping-pong beamforming process, the control circuitry is configured to:

receive, from a device, a training signal transmitted using a first weight vector;

estimate, based on the training signal, an indexed signal, wherein an estimate of the indexed signal comprises a product of the first weight vector and a channel;

determine a second weight vector based on a complex conjugate of the estimate of the indexed signal; and normalize the second weight vector;

wherein the control circuitry is to perform one or more iterations of the ping-pong beamforming process until a convergence criterion is satisfied, wherein the convergence criterion is based on a comparison of a norm of a third weight vector to a predetermined threshold.

10. The apparatus of claim 9, wherein the apparatus is a base station and wherein the control circuitry is further configured to transmit, via the transceiver circuitry to the device, another training signal using a fourth weight vector, the other training signal transmitted to the device before the indexed signal is estimated.

11. The apparatus of claim 9, wherein the control circuitry is further configured to:

determine the complex conjugate of the estimate of the indexed signal.

12. An apparatus, comprising:

transceiver circuitry; and control circuitry coupled with the transceiver circuitry, the control circuitry configured to perform a ping-pong beamforming process, wherein, to perform the ping-pong beamforming process, the control circuitry is configured to:

receive, from a device, a training signal transmitted using a first weight vector;

estimate, based on the training signal, an indexed signal, wherein an estimate of the indexed signal comprises a product of the first weight vector and a channel;

determine a second weight vector based on a complex conjugate of the estimate of the indexed signal; and normalize the second weight vector;

wherein the control circuitry is to perform one or more iterations of the ping-pong beamforming process, wherein at least one iteration of the one or more iterations is performed using a transmission protocol to exchange one or more messages with the device, the transmission protocol comprising a plurality of time slots, and an individual time slot selected from the plurality of time slots is dedicated to one transmission direction and comprises a training period followed by a data period.

13. The apparatus of claim 12, wherein the control circuitry is further configured to:
perform an initialization procedure to acquire a third weight vector in a first time slot; and
send, via the transceiver circuitry and to the device, another training signal in a second time slot that follows the first time slot.

14. The apparatus of claim 9, wherein the control circuitry is further configured to:
transmit, via the transceiver circuitry and in response the second weight vector being normalized, a data symbol using the second weight vector;
receive, via the transceiver circuitry, a data signal from the device; and
apply a normalized third weight vector to the data signal to recover the data symbol.

15. The apparatus of claim 9, wherein the transceiver circuitry is further configured to perform matched filtering.

16. The apparatus of claim 9, wherein the transceiver circuitry is further configured to perform zero-forcing filtering based on the first and second weight vectors.

17. The apparatus of claim 16, wherein the transceiver circuitry is further configured to perform the zero-forcing filtering at a transmitter.

18. The apparatus of claim 16, wherein the transceiver circuitry is further configured to perform the zero-forcing filtering at a receiver.

19. The apparatus of claim 9, wherein the transceiver circuitry comprises a plurality of antennas and wherein the transceiver circuitry is further configured to provide millimeter wave communication.

20. A method of operating a first device, comprising:
sending a first training signal using a first weight vector to a second device;
receiving, from the second device, a second training signal sent using a second weight vector;
estimating, based on the second training signal, an indexed signal, wherein an estimate of the indexed signal comprises a product of the second weight vector and a channel;
determining a third weight vector based on a complex conjugate of the estimate of the indexed signal;
normalizing the third weight vector; and
performing one or more iterations of the sending, the receiving, the estimating, the determining, and the normalizing until a convergence criterion is satisfied, wherein the convergence criterion is based on a comparison of a norm of a fourth weight vector to a predetermined threshold.

21. One or more non-transitory, computer-readable media having one or more instructions, the one or more instructions comprising instructions that, when executed, cause a first device to:
perform a ping-pong beamforming process, wherein the instructions that, when executed, cause the first device to perform the ping-pong beamforming process comprise instructions that, when executed, cause the first device to:
send a first training signal using a first weight vector to a second device;
receive, from the second device, a second training signal sent using a second weight vector;
estimate, based on the second training signal, an indexed signal, wherein an estimate of the indexed signal comprises a product of the second weight vector and a channel;
determine a third weight vector based on a complex conjugate of the estimate of the indexed signal; and
normalize the third weight vector; and
perform one or more iterations of the ping-pong beamforming process until a convergence criterion is satisfied, the convergence criterion based on a comparison of a norm of a fourth weight vector to a predetermined threshold.

22. The one or more non-transitory, computer-readable media of claim 21, wherein the first weight vector is a randomly chosen value or a value determined by a second iteration of the ping-pong beamforming process that precedes the first iteration.

* * * * *

UNITED STATES PATENT AND TRADEMARK OFFICE
CERTIFICATE OF CORRECTION

| | |
|---|---|
| PATENT NO. | : 10,193,613 B2 |
| APPLICATION NO. | : 15/513523 |
| DATED | : January 29, 2019 |
| INVENTOR(S) | : Elisabeth De Carvalho et al. |

Page 1 of 1

It is certified that error appears in the above-identified patent and that said Letters Patent is hereby corrected as shown below:

In the Claims

Column 31
Line 18, replace: "response the" with –response to the–

Signed and Sealed this
Fifth Day of March, 2019

Andrei Iancu
*Director of the United States Patent and Trademark Office*